United States Patent
Jomori

(10) Patent No.: US 10,199,668 B2
(45) Date of Patent: Feb. 5, 2019

(54) FUEL CELL SYSTEM AND PERFORMANCE IMPROVEMENT METHOD OF FUEL CELL SYSTEM

(71) Applicant: TOYOTA JIDOSHA KABUSHIKI KAISHA, Toyota-shi, Aichi-ken (JP)

(72) Inventor: Shinji Jomori, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 166 days.

(21) Appl. No.: 15/287,197

(22) Filed: Oct. 6, 2016

(65) Prior Publication Data

US 2017/0104231 A1    Apr. 13, 2017

(30) Foreign Application Priority Data

Oct. 8, 2015  (JP) .................. 2015-200147
Apr. 19, 2016  (JP) .................. 2016-083807

(51) Int. Cl.
  *H01M 8/04*      (2016.01)
  *H01M 8/04537*   (2016.01)
  (Continued)

(52) U.S. Cl.
  CPC ... *H01M 8/04634* (2013.01); *H01M 8/04223* (2013.01); *H01M 8/04358* (2013.01);
  (Continued)

(58) Field of Classification Search
  CPC ......... H01M 8/04895; H01M 8/04634; H01M 8/04574; H01M 8/04544; H01M 8/04529;
  (Continued)

(56) References Cited

U.S. PATENT DOCUMENTS

2015/0086890 A1* 3/2015 Ikeda ............... H01M 8/04873
429/428

FOREIGN PATENT DOCUMENTS

JP    2003-536232 A    12/2003
JP    2004127548 A  *  4/2004
(Continued)

OTHER PUBLICATIONS

Machine translation of Fusayoshi.*

*Primary Examiner* — Renee Luebke
*Assistant Examiner* — Paul Baillargeon
(74) *Attorney, Agent, or Firm* — Hunton Andrews Kurth LLP

(57) ABSTRACT

A fuel cell system includes: a processing unit configured to perform an activation process of temporarily reducing a cathode potential of a single fuel cell to a target potential for a duration time at a processing frequency; a cationic impurity amount estimating unit configured to estimate an amount of cationic impurities included in an electrolyte membrane of the single fuel cell; and a process degree determining unit configured to determine, when the amount of cationic impurities is large, a degree of the activation process which is higher than that determined when the amount of cationic impurities is small by performing at least one action among actions of changing conditions of the activation process, the actions including an action of reducing the target potential, an action of increasing the duration time, and an action of increasing the processing frequency. The processing unit performs the activation process to the determined degree.

13 Claims, 17 Drawing Sheets

(51) Int. Cl.
  *H01M 8/04492* (2016.01)
  *H01M 8/0432* (2016.01)
  *H01M 8/04858* (2016.01)
  *H01M 8/04223* (2016.01)

(52) U.S. Cl.
  CPC ... *H01M 8/04529* (2013.01); *H01M 8/04552* (2013.01); *H01M 8/04582* (2013.01); *H01M 8/04902* (2013.01); *H01M 8/04492* (2013.01)

(58) Field of Classification Search
  CPC .............. H01M 8/04358; H01M 4/92; H01M 8/04238; H01M 8/04223; H01M 8/0488; H01M 8/04671; H01M 8/04873
  See application file for complete search history.

(56) References Cited

FOREIGN PATENT DOCUMENTS

| | | |
|---|---|---|
| JP | 2010-027297 A | 2/2010 |
| JP | 2010-040285 A | 2/2010 |
| JP | 2013258038 A | 12/2013 |
| JP | 2016-139515 A | 8/2016 |
| WO | 01/99218 A1 | 12/2001 |
| WO | 2013/164873 A1 | 11/2013 |

\* cited by examiner

ANODE SIDE    CATHODE SIDE

5e

ANODE SIDE    CATHODE SIDE

5e

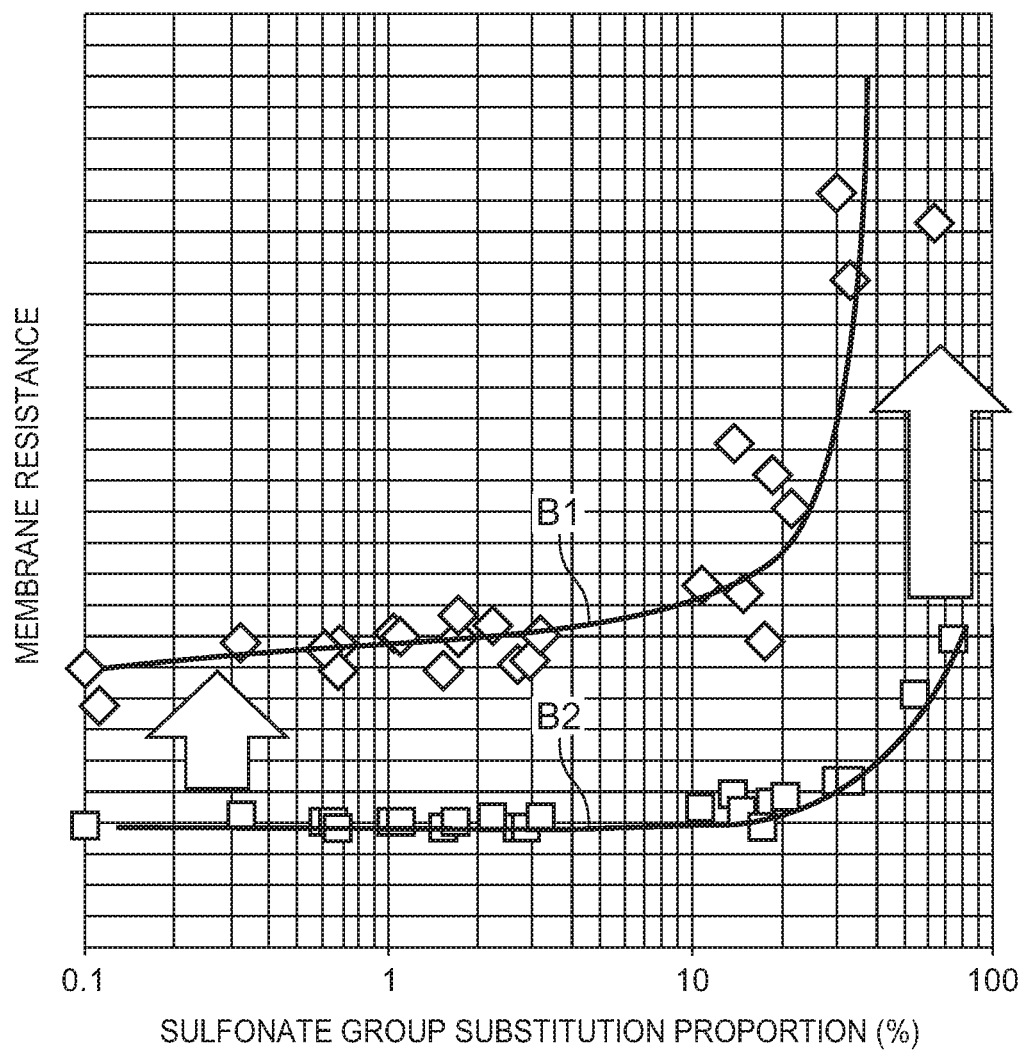

FUEL CELL SYSTEM AND PERFORMANCE IMPROVEMENT METHOD OF FUEL CELL SYSTEM

INCORPORATION BY REFERENCE

The disclosure of Japanese Patent Application No. 2015-200147 and 2016-083807 filed on Oct. 8, 2015 and Apr. 19, 2016 including the specification, drawings and abstract is incorporated herein by reference in its entirety.

BACKGROUND

1. Technical Field

The present disclosure relates to a fuel cell system and a performance improvement method of the fuel cell system.

2. Description of Related Art

A fuel cell system is known which is configured to perform an activation process of temporarily reducing a cathode electric potential of at least one single fuel cell of the fuel cell system to a target electric potential for a duration time so as to improve the performance of an electrode catalyst in the single fuel cell (for example, refer to Published Japanese Translation of PCT application No. 2003-536232 (JP-A-2003-536232)).

When an electrode catalyst of a cathode of a single fuel cell is used, an oxide film is formed on a surface of the electrode catalyst, which causes deterioration in performance of the electrode catalyst. In the above-described activation process, by temporarily reducing a cathode electric potential in the single fuel cell, the electrode catalyst is reduced, the oxide film covering the electrode catalyst is removed, and the deteriorated performance of the electrode catalyst is improved. As a result, the performance of the single fuel cell can be improved.

SUMMARY

The present inventors performed an investigation on the activation process and found that, even in a case where the activation process is performed on a single fuel cell at a predetermined cathode electric potential, the performance of the single fuel cell may not be sufficiently improved. By performing the activation process on a single fuel cell at a lower cathode electric potential than the predetermined cathode electric potential, that is, to a higher degree of the activation process, the performance of an electrode catalyst can be improved regardless of the state of the single fuel cell. However, in a case where the activation process is performed to a higher degree of the activation process, an excessive activation process promotes dissolution of metal in an electrode catalyst, which may cause deterioration in the durability of the electrode catalyst. A technique capable of performing the activation process to an appropriate degree and reliably improving the performance of a single fuel cell is required.

According to a first aspect of the disclosure, there is provided a fuel cell system including: a processing unit configured to perform, during an idle operation of the fuel cell system, an activation process of temporarily reducing a cathode electric potential of at least one single fuel cell of the fuel cell system to a target electric potential for a duration time at a processing frequency; a cationic impurity amount estimating unit configured to estimate an amount of cationic impurities included in an electrolyte membrane of the single fuel cell; and a process degree determining unit configured to determine, when the amount of cationic impurities is large, a degree of the activation process which is higher than that determined when the amount of cationic impurities is small by performing one action or a combination of at least two actions among actions of changing conditions of the activation process, the actions including an action of reducing the target electric potential, an action of increasing the duration time, and an action of increasing the processing frequency. The processing unit performs the activation process to the degree determined by the process degree determining unit.

According to a second aspect of the disclosure, there is provided a fuel cell system including: a processing unit configured to perform, during an idle operation of the fuel cell system, an activation process of temporarily reducing a cathode electric potential of at least one single fuel cell of the fuel cell system to a target electric potential for a duration time at a processing frequency; and a process degree determining unit configured to determine a degree of the activation process by performing one action or a combination of at least two actions among actions of changing conditions of the activation process, the actions including an action of reducing the target electric potential, an action of increasing the duration time, and an action of increasing the processing frequency, in which the process degree determining unit obtains an output voltage of the single fuel cell by increasing an output current of the single fuel cell stepwise from a base output current to a predetermined increase current when the fuel cell system operates at the base output current and a base output voltage, holding the output current at the increase current for an increase period of time, and measuring the output voltage in the increase period of time, when the output current is increased stepwise to the increase current and held at the increase current, the output voltage is reduced stepwise from the base output voltage to a minimal voltage and then is increased to a steady voltage which is lower than the base output voltage, and the process degree determining unit determines the degree of the activation process which becomes higher as a difference between the minimal voltage and the output voltage, which is measured after a preset period of time shorter than the increase period of time elapses from the increase of the output current to the increase current, increases, as a difference between the minimal voltage and the base output voltage increases, or as a period of time, which is required for the output voltage to become the steady voltage after the output current is increased to the increase current, increases. The processing unit performs the activation process to the degree determined by the process degree determining unit.

According to a third aspect of the disclosure, there is provided a fuel cell system including: a processing unit configured to perform, during an idle operation of the fuel cell system, an activation process of temporarily reducing a cathode electric potential of at least one single fuel cell of the fuel cell system to a target electric potential for a duration time at a processing frequency; and a process degree determining unit configured to determine a degree of the activation process by performing one action or a combination of at least two actions among actions of changing conditions of the activation process, the actions including an action of reducing the target electric potential, an action of increasing the duration time, and an action of increasing the processing frequency, in which the process degree determining unit obtains at least one of an output current at a predetermined output voltage or an output voltage at a predetermined output current after the output voltage of the single fuel cell is held at a predetermined voltage value for a predetermined time, and when at least one of a value of the output current at the predetermined output voltage or a value of the output voltage at the predetermined output current is relatively low, the process degree determining unit determines the degree of the activation process which is higher than that determined when at least one of the value of the output current at the predetermined output voltage or the value of the output voltage at the predetermined output current is relatively high. The processing unit performs the activation process to the degree determined by the process degree determining unit.

In the fuel cell systems according to the above-described aspects, the activation process can be performed to an appropriate degree, and the performance of a single fuel cell can be reliably improved.

According to a fourth aspect of the disclosure, there is provided a performance improvement method of a fuel cell system comprising: performing an activation process of temporarily reducing a cathode electric potential of at least one single fuel cell to a target electric potential for a duration time at a processing frequency; estimating the amount of cationic impurities included in an electrolyte membrane of the single fuel cell; determining, when an amount of cationic impurities is large, a degree of the activation process which is higher than that determined when the amount of cationic impurities is small by performing one action or a combination of at least two actions among actions of changing conditions of the activation process, the actions including an action of reducing the target electric potential, an action of increasing the duration time, and an action of increasing the processing frequency; and performing the activation process to the determined degree when an idle operation of the fuel cell system is performed.

According to a fifth aspect of the disclosure, there is provided a performance improvement method of a fuel cell system comprising: performing, during an idle operation of the fuel cell system, an activation process of temporarily reducing a cathode electric potential of at least one single fuel cell of the fuel cell system to a target electric potential for a duration time at a processing frequency; determining a degree of the activation process by performing one action or a combination of at least two actions among actions of changing conditions of the activation process, the actions including an action of reducing the target electric potential, an action of increasing the duration time, and an action of increasing the processing frequency; obtaining an output voltage of the single fuel cell by increasing an output current of the single fuel cell stepwise from a base output current to a predetermined increase current when the fuel cell system operates at the base output current and a base output voltage, holding the output current at the increase current for an increase period of time, and measuring the output voltage in the increase period of time; determining, when the output current is increased stepwise to the increase current and held at the increase current, the output voltage is reduced stepwise from the base output voltage to a minimal voltage and then is increased to a steady voltage which is lower than the base output voltage, the degree of the activation process which becomes higher as a difference between the minimal voltage and the output voltage, which is measured after a preset period of time shorter than the increase period of time elapses from the increase of the output current to the increase current, increases, as a difference between the minimal voltage and the base output voltage increases, or as a period of time, which is required for the output voltage to become the steady voltage after the output current is increased to the increase current, increases, and performing the activation process to the determined degree.

According to a sixth aspect of the disclosure, there is provided a performance improvement method of a fuel cell system comprising: performing, during an idle operation of the fuel cell system, an activation process of temporarily reducing a cathode electric potential of at least one single fuel cell of the fuel cell system to a target electric potential for a duration time at a processing frequency; determining a degree of the activation process by performing one action or a combination of at least two actions among actions of changing conditions of the activation process, the actions including an action of reducing the target electric potential, an action of increasing the duration time, and an action of increasing the processing frequency; obtaining at least one of an output current at a predetermined output voltage or an output voltage at a predetermined output current after the output voltage of the single fuel cell is held at a predetermined voltage value for a predetermined time; determining, when at least one of a value of the output current at the predetermined output voltage or a value of the output voltage at the predetermined output current is relatively low, the degree of the activation process which is higher than that determined when at least one of the value of the output current at the predetermined output voltage or the value of the output voltage at the predetermined output current is relatively high; and performing the activation process to the determined degree.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a graph showing an example of a relationship between the resistance of an electrolyte membrane and the amount of cationic impurities;

DETAILED DESCRIPTION OF EMBODIMENTS

Figure 1:
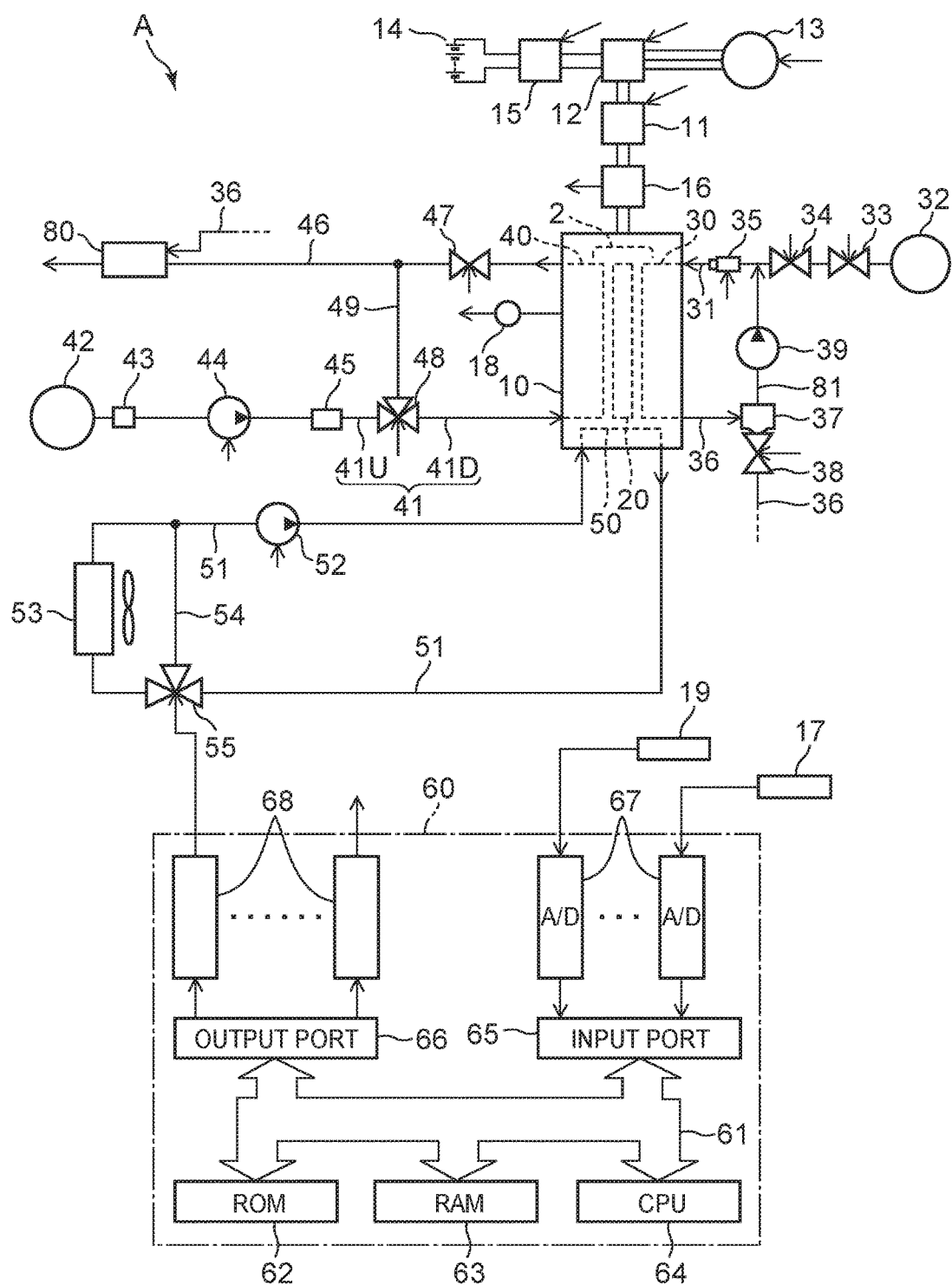
FIG. 1 is a block diagram a fuel cell system.

Referring to FIG. 1, a fuel cell system A includes a fuel cell stack 10. The fuel cell stack 10 includes a laminate including plural single fuel cells 2 that are laminated in a laminating direction. Each of the single fuel cells 2 of the laminate includes: a membrane-electrode-gas diffusion layer assembly 20; and separators (not shown) that are disposed on opposite sides of the membrane-electrode-gas diffusion layer assembly 20. The membrane-electrode-gas diffusion layer assembly 20 includes: an electrolyte membrane; and an anode and a cathode that are disposed on opposite sides of the electrolyte membrane.

An anode of one single fuel cell 2 is electrically connected to a cathode of another single fuel cell 2 adjacent to the single fuel cell 2 on a first side of the laminate through a separator, and a cathode of the single fuel cell 2 is electrically connected to an anode of another single fuel cell 2 adjacent to the single fuel cell 2 on a second side of the laminate through a separator. The anode of the single fuel cell 2 on the first side of the laminate and the cathode of the single fuel cell 2 on the second side of the laminate forms an electrode of the fuel cell stack 10. The electrode of the fuel cell stack 10 is electrically connected to an inverter 12 through a DC/DC converter 11, and the inverter 12 is electrically connected to a motor generator 13. The fuel cell system A includes a power storage device 14, and this power storage device 14 is electrically connected to the inverter 12 through a DC/DC converter 15. The DC/DC converter 11 controls values of an output current and an output voltage output from the fuel cell stack 10, and converts the values of the output current and the output voltage and supplies the converted values of the output current and the output voltage to the inverter 12. The inverter 12 converts a DC current, which is output from the DC/DC converter 11 or the power storage device 14, into an AC current. The DC/DC converter 15 controls a voltage output from the fuel cell stack 10 or the motor generator 13 to the power storage device 14 to be low, or controls a voltage output from the power storage device 14 to the motor generator 13 to be high. In the fuel cell system A shown in FIG. 1, the power storage device 14 is formed of a battery.

In the single fuel cell 2, a fuel gas flow path for supplying hydrogen gas as fuel gas to the anode, an oxidant gas flow path for supplying air as oxidant gas to the cathode, and a cooling water flow path for supplying cooling water to the single fuel cell 2 are formed. The fuel gas flow paths of the plural single fuel cells 2 are connected to each other in parallel, the oxidant gas flow paths of the plural single fuel cells 2 are connected to each other in parallel, and the cooling water flow paths of the plural single fuel cells 2 are connected to each other in parallel. As a result, a fuel gas flow path 30, an oxidant gas flow path 40, and a cooling water flow path 50 are formed in the fuel cell stack 10. The fuel gas flow path 30, the oxidant gas flow path 40, and the cooling water flow path 50 include a fuel gas manifold, an oxidant gas manifold, and a cooling water manifold.

A fuel gas supply pipe 31 is connected to an inlet of the fuel gas flow path 30, and this fuel gas supply pipe 31 is connected to a fuel gas source 32. In an embodiment shown FIG. 1, the fuel gas source 32 is formed of a hydrogen tank. In the fuel gas supply pipe 31, in order from upstream to downstream, a shutoff valve 33, a regulator 34 which regulates the pressure of fuel gas in the fuel gas supply pipe 31, and a fuel gas injector 35 for supplying the fuel gas from the fuel gas source 32 to the fuel cell stack 10 are disposed. On the other hand, an anode off gas pipe 36 is connected to an outlet of the fuel gas flow path 30. In a case where the shutoff valve 33 and the fuel gas injector 35 are opened, the fuel gas in the fuel gas source 32 is supplied into the fuel gas flow path 30 of the fuel cell stack 10 through the fuel gas supply pipe 31. At this time, the gas flowing out from the fuel gas flow path 30, that is, the anode off gas flows into the anode off gas pipe 36. In the anode off gas pipe 36, in order from upstream to downstream, a gas-liquid separator 37 that separates the anode off gas into gas and liquid, and a discharge control valve 38 which controls discharge of the liquid accumulating in the gas-liquid separator 37 are disposed. An inlet of a fuel gas circulation pipe 81 is connected to an upper portion of the gas-liquid separator 37, and an outlet of the fuel gas circulation pipe 81 is connected to a portion of the fuel gas supply pipe 31 which is disposed upstream of the fuel gas injector 35. In the fuel gas circulation pipe 81, a fuel gas circulation pump 39 which feeds the gas in the gas-liquid separator 37, that is, the separated anode off gas is disposed. In a case where the fuel gas circulation pump 39 is driven, the anode off gas accumulating in the gas-liquid separator 37 is circulated to the fuel gas supply pipe 31. In another embodiment not shown in the drawings, the gas-liquid separator 37 in the anode off gas pipe 36 is not provided.

An oxidant gas supply pipe 41 is connected to an inlet of the oxidant gas flow path 40, and this oxidant gas supply pipe 41 is connected to an oxidant gas source 42. In the embodiment shown FIG. 1, the oxidant gas source 42 is formed of air. In the oxidant gas supply pipe 41, in order from upstream to downstream, a gas cleaner 43, an air supplier or a turbo compressor 44 which feeds the oxidant gas, and an intercooler 45 for cooling the oxidant gas which is fed into the fuel cell stack 10 by the turbo compressor 44 are disposed. On the other hand, a cathode off gas pipe 46 is connected to an outlet of the oxidant gas flow path 40. In the cathode off gas pipe 46, a cathode off gas control valve 47 which controls the amount of cathode off gas flowing through the inside of the cathode off gas pipe 46 or the pressure in the oxidant gas flow path 40 of the fuel cell stack 10 is disposed. An inlet of an oxidant gas bypass pipe 49 is connected to a portion of the oxidant gas supply pipe 41 which is disposed downstream of the intercooler 45, and an outlet of the oxidant gas bypass pipe 49 is connected to a portion of the cathode off gas pipe 46 which is disposed downstream of the cathode off gas control valve 47. In the oxidant gas bypass pipe 49, an oxidant gas bypass control valve 48 is disposed. The oxidant gas bypass control valve 48 controls the flow rate of air which flows from the oxidant gas supply pipe 41 to the cathode off gas pipe 46 while bypassing the fuel cell stack 10. In the fuel cell system A shown in FIG. 1, the oxidant gas bypass control valve 48 is formed of a three-way valve. In a case where the turbo compressor 44 is driven and the oxidant gas bypass control valve 48 connects a downstream oxidant gas supply pipe 41D to an upstream oxidant gas supply pipe 41U, the oxidant gas is supplied into the oxidant gas flow path 40 of the fuel cell stack 10, the upstream oxidant gas supply pipe 41U being provided at a portion of the oxidant gas supply pipe 41 which is disposed upstream of the oxidant gas bypass control valve 48, and the downstream oxidant gas supply pipe 41D being provided at a portion of the oxidant gas supply pipe 41 which is disposed downstream of the oxidant gas bypass control valve 48. At this time, the gas flowing out from the oxidant gas flow path 40, that is, the cathode off gas flows into the cathode off gas pipe 46. In a case where the oxidant gas bypass control valve 48 connects the oxidant gas bypass pipe 49 to the upstream oxidant gas supply pipe 41U, a portion or all of the amount of air discharged from the turbo compressor 44 is supplied to the cathode off gas pipe 46 through the oxidant gas bypass pipe 49. In the embodiment shown in FIG. 1, the turbo compressor 44 is formed of a centrifugal or axial turbo compressor. From the viewpoint of a reduction in size or the like, a centrifugal turbo compressor is preferably used.

A diluter 80 is provided in a portion of the cathode off gas pipe 46 which is disposed downstream of the outlet of the oxidant gas bypass pipe 49. An outlet of the anode off gas pipe 36 is connected to the diluter 80. In the diluter 80, the hydrogen gas included in the anode off gas is diluted with the cathode off gas such that the hydrogen gas concentration in the gas discharged from the diluter 80 to the outside air is an allowable value or less. The cathode off gas flowing into the diluter 80 also includes the oxidant gas flowing from the oxidant gas bypass pipe 49.

One end of a cooling water supply pipe 51 is connected to an inlet of the cooling water flow path 50, and the other end of the cooling water supply pipe 51 is connected to an outlet of the cooling water flow path 50. In the cooling water supply pipe 51, a cooling water pump 52 which feeds cooling water, and a radiator 53 are disposed. A portion of the cooling water supply pipe 51, which is disposed upstream of the radiator 53, is connected to a portion of the cooling water supply pipe 51, which is disposed downstream of the radiator 53 and between the radiator 53 and the cooling water pump 52, through a radiator bypass pipe 54. In addition, a radiator bypass control valve 55 which controls the amount of the cooling water flowing through the inside of the radiator bypass pipe 54 is provided. In the fuel cell system A shown in FIG. 1, the radiator bypass control valve 55 is formed of a three-way valve and is disposed at an inlet of the radiator bypass pipe 54. In a case where the cooling water pump 52 is driven, the cooling water discharged from the cooling water pump 52 flows into the cooling water flow path 50 of the fuel cell stack 10 through the cooling water supply pipe 51, further flows into the cooling water supply pipe 51 through the cooling water flow path 50, and then returns to the cooling water pump 52 through the radiator 53 or the radiator bypass pipe 54.

An electronic control unit 60 is formed of a digital computer and includes a read-only memory (ROM) 62, a random access memory (RAM) 63, a microprocessor (CPU) 64, an input port 65, and an output port 66 which are connected to each other through a bidirectional bus 61. An output signal of an output sensor 16 which measures an output current and an output voltage of the fuel cell stack 10, an output signal of an output sensor 17 which measures an output current and an output voltage of each of the plural single fuel cells 2 of the laminate, an output signal of a temperature sensor 18 which measures a temperature of the fuel cell stack 10, an output signal of a range sensor 19 which detects a range of a transmission of a vehicle, and an output signal of a pressure sensor (not shown) in the fuel cell system A are input to the input port 65 at a predetermined time interval (for example, 0.1 ms) through corresponding AD converters 67. Data of the output signals which are input from the respective sensors to the input port 65 are stored on the RAM 63 as an operating history. On the other hand, the output port 66 are electrically connected to the shutoff valve 33, the regulator 34, the fuel gas injector 35, the discharge control valve 38, the fuel gas circulation pump 39, the turbo compressor 44, the cathode off gas control valve 47, the oxidant gas bypass control valve 48, the cooling water pump 52, and the radiator bypass control valve 55 through corresponding drive circuits 68.

However, when it is desired to generate power in the fuel cell stack 10, the shutoff valve 33 and the fuel gas injector 35 are opened such that the fuel gas is supplied to the fuel cell stack 10. In addition, the turbo compressor 44 is driven such that the oxidant gas is supplied to the fuel cell stack 10. As a result, in the single fuel cell, an electrochemical reaction ($H_2 \rightarrow 2H^+ + 2e^-$, $(\frac{1}{2})O_2 + 2H^+ + 2e^- \rightarrow H_2O$) occurs such that electric energy is generated. The generated electric energy is supplied to the motor generator 13. As a result, the motor generator 13 operates as an electric motor for driving a vehicle such that an electric vehicle is driven. On the other hand, for example, when a vehicle is braking, the motor generator 13 operates as a regenerative apparatus such that the regenerated electric energy accumulates in the power storage device 14.

Figure 2:
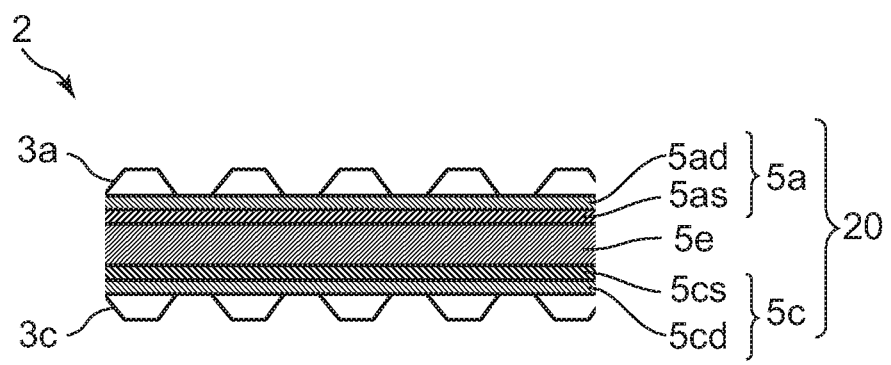
FIG. 2 is a partial sectional view showing a single fuel cell.

As shown in FIG. 2, in the membrane-electrode-gas diffusion layer assembly 20 of the single fuel cell 2, an anode 5a is formed on one side of an electrolyte membrane 5e and includes an anode catalyst layer 5as and an anode gas diffusion layer 5ad, and a cathode 5c is formed on the other side of the electrolyte membrane 5e and includes a cathode catalyst layer 5cs and a cathode gas diffusion layer 5cd. An anode separator 3a is disposed on the anode 5a side of the membrane-electrode-gas diffusion layer assembly 20, and a cathode separator 3c is disposed on the cathode 5c side of the membrane-electrode-gas diffusion layer assembly 20.

As a material of the electrolyte membrane 5e, that is, as an electrolyte material, for example, a fluorine-based cation exchange resin having cation conductivity such as perfluorosulfonic acid can be used, and specific examples thereof include NAFION (registered trade name). Examples of a material of electrode catalysts of the anode catalyst layer 5as and the cathode catalyst layer 5cs include a catalyst-supporting carbon on which platinum or a platinum alloy is supported. In another embodiment not shown in the drawings, an ionomer which is formed of the same electrolyte material as that of the electrolyte membrane 5e, for example, a fluorine-based cation exchange resin is added to the catalyst-supporting carbon. As a material of the anode gas diffusion layer 5ad and the cathode gas diffusion layer 5cd, for example, a conductive porous body is used, and examples thereof include: a carbon porous body such as carbon paper, carbon cloth, or glassy carbon; and a metal porous body such as metal mesh or metal foam. Examples of a material of the anode separator 3a and the cathode separator 3c include a metal such as stainless steel or Ti.

In a case where it is desired to generate power in the fuel cell system A shown in FIG. 1, a desired current value of the fuel cell stack 10 is obtained according to the charge amount of the power storage device 14 and the load of the motor generator 13 which is represented by, for example, the depressing amount of an accelerator pedal. Next, a flow rate of fuel gas and a flow rate of oxygen gas required for an output current value of the fuel cell stack 10 to reach a desired current value, that is, a desired flow rate of fuel gas and a desired flow rate of oxygen gas are obtained, and a desired flow rate of oxidant gas is obtained based on the desired flow rate of oxygen gas. Next, the regulator 34 and the fuel gas injector 35 are controlled such that the flow rate of fuel gas fed to the fuel cell stack 10 is the desired flow rate of fuel gas, and the turbo compressor 44 and the cathode off gas control valve 47 are controlled such that the flow rate of oxidant gas fed to the fuel cell stack 10 is the desired flow rate of oxidant gas.

However, in the fuel cell system A, during the operation of the fuel cell system A, an oxide film is formed on the electrode catalyst (for example, platinum or a platinum alloy) of the cathode catalyst layer 5cs of the single fuel cell 2 in the fuel cell stack 10. As a result, the performance of the electrode catalyst deteriorates, and the performance of the single fuel cell 2 deteriorates. In order to deal with this problem, in the fuel cell system A, during the operation of the fuel cell system A, an activation process of reducing the amount of air on the cathode 5c side to temporarily reduce the cathode electric potential of the single fuel cell 2 is performed to improve the performance of the electrode catalyst. However, although the reason is not clear, the performance of the single fuel cell may not be sufficiently improved even after performing the activation process. Therefore, in order to clarify the reason why the performance of the single fuel cell 2 is not sufficiently improved even after performing the activation process, the present inventors focused on the amount of cationic impurities of metal in the electrolyte membrane 5e as the reason for that.

Here, the cations are incorporated into the single fuel cell 2 of the fuel cell stack 10 along with the air supplied to the fuel cell stack 10 during the operation of the fuel cell system A. As these cations, for example, Ca or Na included in a snow melting agent and Fe, Mo, Cr, or Al included in a component of the fuel cell system A are considered. As the electrolyte membrane 5e of the single fuel cell 2, a cation exchange membrane such as NAFION (registered trade name) is used. Therefore, in a case where the cations are incorporated into the single fuel cell 2, the cations infiltrate into the ion exchange membrane, remain in the membrane, and are substituted with a sulfonate group in the membrane. Therefore, in a case where the amount of the cations in the cation exchange membrane increases, the amount of the sulfonate group, which relates to $H^+$ ion conduction, in the cation exchange membrane is reduced, it is difficult to move H+ ions, that is, proton conductivity deteriorates. As a result, the battery performance deteriorates. Thus, it is thought that, in a case where the amount of cationic impurities is large, the effect of the activation process is cancelled out by the deterioration in the battery performance caused by the cationic impurities, and thus the performance of the single fuel cell 2 is not improved.

The present inventors performed an investigation on the relationship between the amount of cationic impurities in the electrolyte membrane 5e and the activation process and discovered the following facts. That is, in a case where the amount of cationic impurities is small during the activation process, the degree of performance improvement of the single fuel cell 2 is substantially the same regardless of whether the degree of the activation process is low or high. However, in a case where the amount of cationic impurities is large during the activation process, the degree of performance improvement of the single fuel cell 2 is low when the degree of the activation process is low, and the degree of the performance improvement of the single fuel cell 2 is high when the degree of the activation process is high. That is, the degree of performance improvement of the single fuel cell 2 obtained by the activation process depends on the amount of cationic impurities. The reason why the performance improvement of the single fuel cell 2 is not sufficient even after performing the activation process is that the degree of the activation process is low although the amount of cationic impurities in the electrolyte membrane 5e is low, that is, the activation process is not performed in consideration of the amount of cationic impurities. Thus, in order to reliably improve the performance of the single fuel cell 2 in the activation process, it is necessary to change the degree of the activation process depending on the amount of cationic impurities. Hereinafter, the fuel cell system A according to the present disclosure in which the degree of the activation process is changed depending on the amount of cationic impurities will be described in detail.

First, the relationship between the amount of cationic impurities in the electrolyte membrane 5e of the single fuel cell 2 and the activation process will be described.

Figure 3:
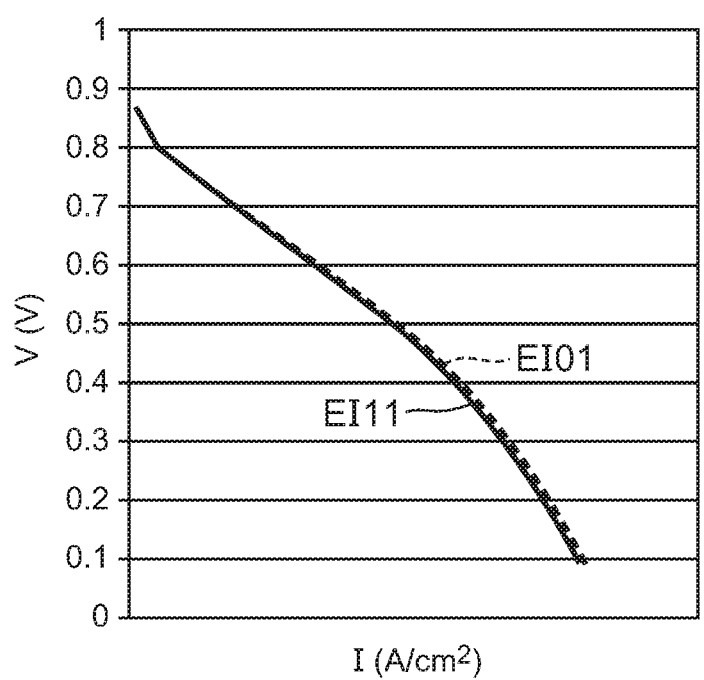
FIG. 3 is a graph showing a relationship between an output current and an output voltage of a single fuel cell including no cationic impurities.
Figure 4:
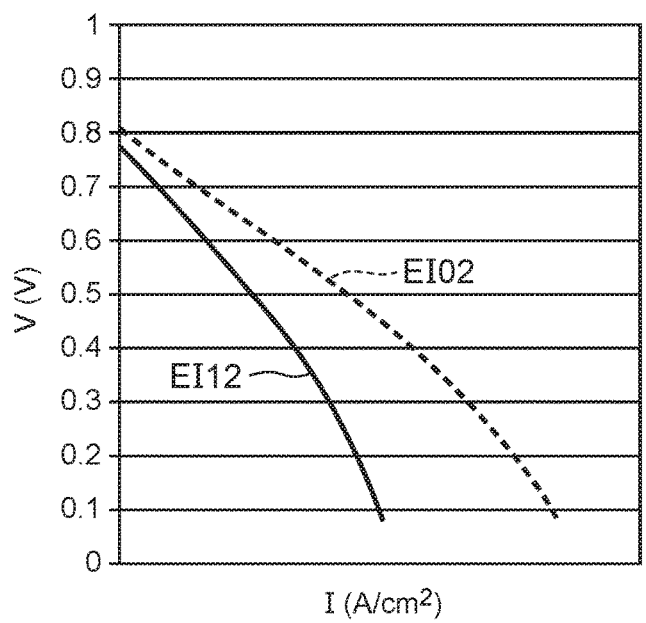
FIG. 4 is a graph showing a relationship between an output current and an output voltage of a single fuel cell including cationic impurities.

FIG. 3 is a graph showing a relationship between an output voltage and an output current of the single fuel cell 2, that is, IV characteristics in a case where the electrolyte membrane 5e does not include cationic impurities. FIG. 4 is a graph showing IV characteristics of the single fuel cell 2 in a case where the electrolyte membrane 5e includes cationic impurities. In FIGS. 3 and 4, the horizontal axis represents the output current density, and the vertical axis represents the output voltage. In the embodiment, as an example of an index indicating the amount of cationic impurities in the electrolyte membrane 5e, a proportion of protons of the sulfonate group in the electrolyte membrane 5e substituted with cationic impurities is used, that is, a sulfonate group substitution proportion is used. In FIG. 3, the sulfonate group substitution proportion is 0%, and in FIG. 4, THE sulfonate group substitution proportion IS 30%. An experiment was performed under conditions of the single fuel cell 2: a 1 cm² cell, fuel gas/oxidant gas: H₂/Air (1 L/min), and a temperature of the single fuel cell 2: 83° C. (relative humidity: 30%).

In FIGS. 3 and 4, a curve EI01 and a curve EI02 represent cases where the cathode electric potential of the single fuel cell 2 is continuously held at 0 V for 30 minutes immediately before measuring the IV characteristics. In the embodiment, a value at which the cathode electric potential is held immediately before the measurement will be referred to as "pre-holding electric potential", and the pre-holding electric potential in this case is 0 V. On the other hand, in FIGS. 3 and 4, a curve EI11 and a curve EI12 represent cases where the cathode electric potential of the single fuel cell 2 is continuously held at 0.6 V for 30 minutes immediately before measuring the IV characteristics, that is, cases where the pre-holding electric potential is 0.6 V.

In other words, the curve EI01 and the curve EI02 show the IV characteristics measured after the performance of the single fuel cell 2 is improved by substantially performing the activation process on the single fuel cell 2 at a target electric potential of 0 V for a duration time of 30 minutes instead of reducing the flow rate of oxidant gas on the cathode 5c side. Likewise, the curve EI11 and the curve EI12 show the IV characteristics measured after the performance of the single fuel cell 2 is improved by substantially performing the activation process on the single fuel cell 2 at a target electric potential of 0.6 V for a duration time of 30 minutes instead of reducing the flow rate of oxidant gas on the cathode 5c side.

As shown in FIG. 3, the curve EI01 and the curve EI11 do not substantially overlap each other. Thus, it was found that, in the single fuel cell 2 which is not contaminated by the cationic impurities, the degree of performance (IV characteristics) improvement does not change without depending on whether the target electric potential of the activation process is 0 V or 0.6 V. In other words, the effect of the activation process of the single fuel cell 2 does not substantially change depending on the target electric potential of the activation process. Therefore, it was found that, in a case where the single fuel cell 2 is not contaminated by cationic impurities, even when the degree of the activation process is low (for example, 0.6 V), the performance of the single fuel cell 2 is improved.

On the other hand, as shown in FIG. 4, the curve EI12 is sharper than the curve EI02. Thus, it was found that, in the single fuel cell 2 which is contaminated by the cationic impurities, in a case where the target electric potential of the activation process is 0.6 V, the degree of performance (IV characteristics) improvement is lower than that measured in a case where the target electric potential is 0 V. In other words, the effect of the activation process of the single fuel cell 2 change significantly depending on the target electric potential of the activation process. Therefore, it was found that, in a case where the single fuel cell 2 is contaminated by cationic impurities, as the degree of the activation process becomes higher (for example, 0 V), the performance of the single fuel cell 2 is further improved.

Figure 5:
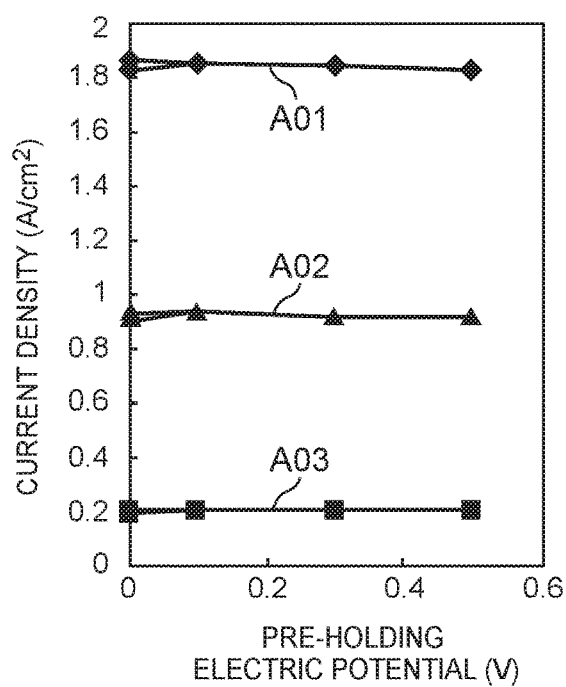
FIG. 5 is a graph showing a relationship between an output current density and a pre-holding voltage of a single fuel cell including no cationic impurities at a predetermined output voltage.
Figure 6:
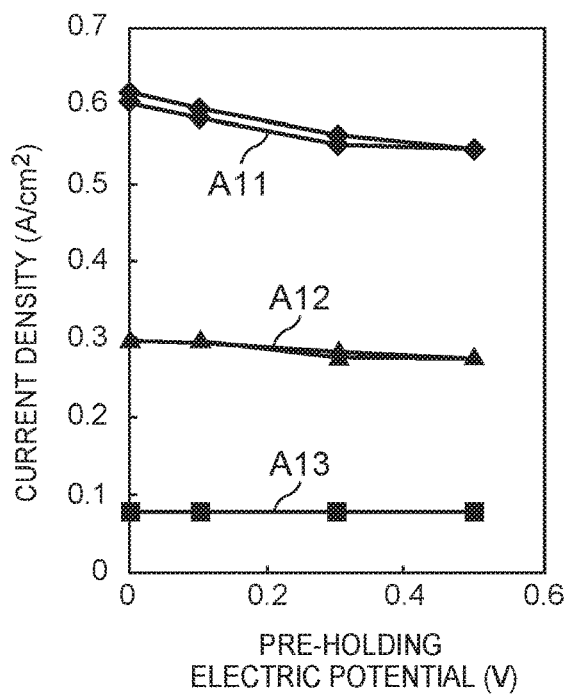
FIG. 6 is a graph showing a relationship between an output current density and a pre-holding voltage of a single fuel cell including a small amount of cationic impurities at a predetermined output voltage.
Figure 7:
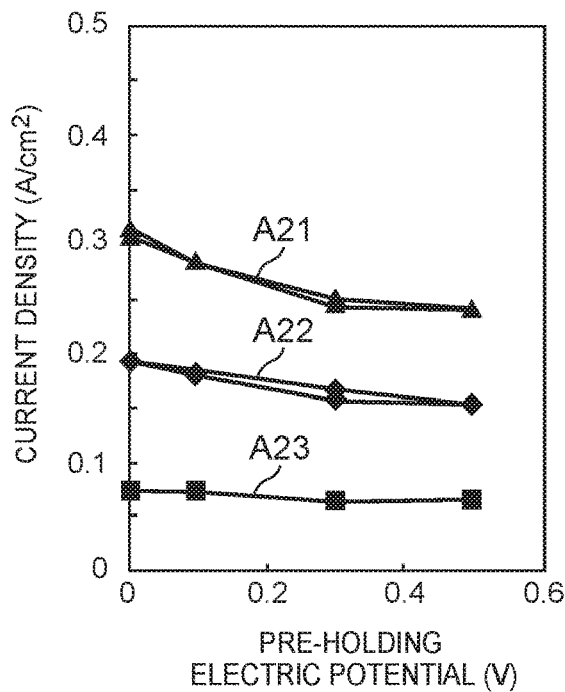
FIG. 7 is a graph showing a relationship between an output current density and a pre-holding voltage of a single fuel cell including a large amount of cationic impurities at a predetermined output voltage.

The results of the experiment shown in FIGS. 3 and 4 are collectively shown in FIGS. 5 to 7. FIG. 5 is a graph showing a relationship between an output current density and a pre-holding voltage of the single fuel cell 2 at a predetermined output voltage when the sulfonate group substitution proportion of the electrolyte membrane 5e in the single fuel cell 2 is 0%. The horizontal axis represents the pre-holding electric potential, and the vertical axis represents the output current density. In FIG. 5, curves A01, A02, and A03 represent cases where the oxygen concentrations in the oxidant gas supplied to the cathode 5c are 16%, 5%, and 1%, respectively. Two curves are drawn for each case in order to represent that the measurement is performed twice for each case. The curves A01, A02, and A03 in FIG. 5 show a relationship between the output current density and the pre-holding electric potential at the predetermined output voltage which is obtained by measuring the IV characteristics after continuously holding the cathode electric potential of the single fuel cell 2 at the pre-holding electric potential for 30 minutes. The IV characteristics are measured after the performance of the single fuel cell 2 is improved by substantially performing the activation process on the single fuel cell 2 at a target electric potential that is the pre-holding electric potential for a duration time of 30 minutes.

As shown in FIG. 5, in a case where the sulfonate group substitution proportion of the electrolyte membrane 5e in the single fuel cell 2 is 0%, that is, in case where the single fuel cell 2 is not contaminated by cationic impurities, the output current density is substantially constant without depending on the pre-holding electric potential. Accordingly, the degree of performance improvement of the single fuel cell 2 is substantially constant without depending on the target electric potential of the activation process. Therefore, it can be considered that, in a case where the single fuel cell 2 is not contaminated by cationic impurities, even when the degree of the activation process is relatively low, the performance improvement of the single fuel cell 2 is sufficient. The same shall be applied to a case where the oxygen concentration is changed, that is, the output current density is changed.

FIGS. 6 and 7 are graphs showing a relationship between an output current density and a pre-holding voltage of the single fuel cell 2 at a predetermined output voltage when the sulfonate group substitution proportions of the electrolyte membrane 5e in the single fuel cell 2 are 30% and 70%, respectively. Regarding the horizontal axis, the vertical axis, the curves A11, A12, and A13, and curves A21, A22, and A23, the description of FIG. 5 can be applied to FIGS. 6 and 7.

As shown in FIGS. 6 and 7, in a case where the sulfonate group substitution proportion of the electrolyte membrane 5e in the single fuel cell 2 is 30% or 70%, that is, in case where the single fuel cell 2 is contaminated by cationic impurities, the output current density changes depending on the pre-holding electric potential even at the same output voltage. In addition, as the pre-holding electric potential decreases, the output current density increases. Accordingly, the degree of performance improvement of the single fuel cell 2 changes depending on the target electric potential of the activation process, and as the target electric potential decreases, the performance is further improved. This tendency becomes significant as the amount of cationic impurities increases. Accordingly, it can be considered that, in a case where the single fuel cell 2 is contaminated by cationic impurities, when the amount of cationic impurities is large, the performance of the single fuel cell 2 can be appropriately improved by determining the degree of the activation process which is higher than that measured when the amount of cationic impurities is small. The same shall be applied to a case where the oxygen concentration is changed, that is, the output current density is changed.

Figure 8A:
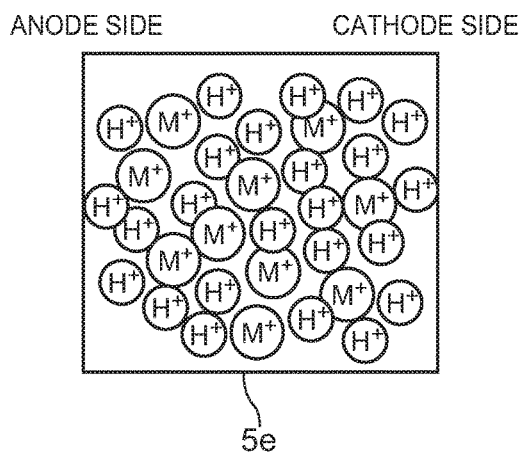
FIG. 8A is a diagram showing the reason for the phenomena of FIGS. 5 to 7.
Figure 8B:
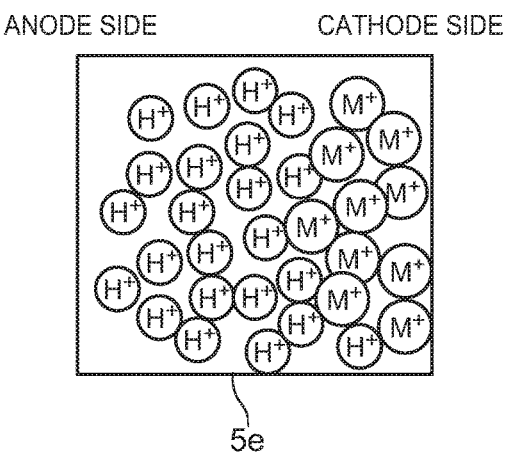
FIG. 8B is a diagram showing the reason for the phenomena of FIGS. 5 to 7.

The mechanism for the phenomenon of FIGS. 5 to 7 can be presumed to be, for example, as follows. FIGS. 8A and 8B are diagrams showing the reason for the phenomena of FIGS. 5 to 7. FIG. 8A shows a case where the pre-holding electric potential is low, that is, the degree of the activation process is high. FIG. 8B shows a case where the pre-holding electric potential is high, that is, the degree of the activation process is low. M⁺ represents a cation. H⁺ represents a proton (hydrogen ion). The phenomenon of FIGS. 5 to 7 cannot be explained with the removal of the oxide film on the electrode catalyst and can be presumed to be as follows. During a normal operation, the cathode electric potential is high, and thus cations are concentrated, for example, as shown in FIG. 8B. However, it is thought that, by performing the activation process to a high degree, a difference in electric potential between the anode 5a and the cathode 5c is reduced, cations are not concentrated on the cathode side, and the cations are dispersed as shown in FIG. 8A. On the other hand, it is thought that, by performing the activation process to a low degree, a difference in electric potential between the anode 5a and the cathode 5c is not reduced, cations are still concentrated on the cathode side, and the cations remain as shown in FIG. 8B. Accordingly, it is thought that: in a case where the degree of the activation process is high immediately after the activation process, the cations are as shown in FIG. 8A; in a case where the degree of the activation process is low immediately after the activation process, the cations are as shown in FIG. 8B; and the IV characteristics are as shown in FIGS. 5 to 7 when measured in the states of FIGS. 8A and 8B.

As described above, by holding the cathode electric potential at a low electric potential due to the activation process, the unevenness of the concentration of the cations on the cathode side of the electrolyte membrane 5e is eliminated (FIG. 8A). Accordingly, it is thought that the activation process has not only an effect of removing the oxide film on the electrode catalyst of the cathode but also an effect of correcting the concentration of cationic impurities in the electrolyte membrane 5e such that the cationic impurities are uniformly distributed. In other words, it is thought that the performance of the single fuel cell 2 deteriorates not only due to the oxide film on the electrode catalyst but also the concentration of cationic impurities in the electrolyte membrane 5e. However, in the activation process according to the embodiment, the oxide film on the electrode catalyst can be removed, and cationic impurities can be uniformly distributed in the electrolyte membrane 5e. Therefore, the performance of the single fuel cell 2 can be further improved.

Based on the above results, in the embodiment, the new activation process of changing the degree of the activation process depending on the amount of cationic impurities is performed instead of the activation process of simply reducing the cathode electric potential to a predetermined target electric potential. That is, in a case where the amount of cationic impurities in the electrolyte membrane 5e is zero or extremely small, a relatively low degree of the activation process is determined because it is only necessary to remove the oxide film on the electrode catalyst in the activation process. In this case, it is not necessary to eliminate the unevenness of the concentration of cationic impurities. As a result, the performance of the electrode catalyst is improved, and thus the performance of the single fuel cell 2 is improved. On the other hand, in a case where the amount of cationic impurities in the electrolyte membrane 5e is large, a relatively high degree of the activation process is determined because it is necessary to remove the oxide film on the electrode catalyst and to eliminate the unevenness of the concentration of cationic impurities in the activation process. As a result, the performance of the electrode catalyst is improved, the unevenness of the concentration of cationic impurities is eliminated, and thus the performance of the single fuel cell 2 is improved. In this way, when the amount of cationic impurities in the electrolyte membrane 5e is large, a high degree of the activation process is determined, and when the amount of cationic impurities in the electrolyte membrane 5e is small, a low degree of the activation process is determined. As a result, the performance of the electrode catalyst can be sufficiently improved, and the amount of metals eluted from the electrode catalyst can be reduced.

Here, the degree of the activation process is indicated by the value of the target electric potential of the cathode electric potential, the length of the duration time during which the cathode electric potential is held at the target electric potential, or the frequency of the activation process. The degree of the activation process can be changed by changing one condition or a combination of two or more conditions. Here, in a case where the value of the target electric potential of the cathode electric potential is changed to increase the degree of the activation process, the target electric potential is determined to be low. In a case where the length of the duration time during which the cathode electric potential is held at the target electric potential is changed to increase the degree of the activation process, the duration time is determined to be long. In a case where the frequency of the activation process is changed to increase the degree of the activation process, the frequency of the activation process is determined to be high. The reason for this is presumed to be as follows. The moving speed of cationic impurities is slow during an electric potential change, but the concentration of cationic impurities on the cathode side can be corrected by increasing the duration time. In addition, when the frequency is increased, the cumulative time during which the cathode electric potential is held at a low electric potential is increased, and thus the same effect as that of the case where the duration time is increased can be obtained.

In the embodiment, the value of the target electric potential of the cathode electric potential, the length of the duration time during which the cathode electric potential is held at the target electric potential, and the frequency of the activation process are changed to adjust the degree of the activation process. The range of the target electric potential is, for example, 0.6 V to 0.05 V. The range of the duration time is, for example, 1 second to continuous. An interval indicating the frequency of the activation process is, for example, 1 minute to continuous. Table 1 below shows examples of combinations of the degree of the activation process in the embodiment.

TABLE 1

| | Degree of Activation Process | | | |
| --- | --- | --- | --- | --- |
| | L1 | L2 | L3 | L4 |
| End Potential | 0.05 V | 0.2 V | 0.4 V | 0.6 V |
| Process Frequency | Continuous | 1 Minute | 5 Minutes | 10 Minutes |
| Duration Time | Continuous | 10 Seconds | 5 Seconds | 1 Second |
| Activation Effect | Extremely High | High | Slightly Low | Low |
| Electrode Catalyst Elution | Extremely Large | Large | Slightly Small | Small |

In Table 1, the degree of the activation process is divided into four levels. In a case where the degree of the activation process is the lowest level L4, the target electric potential is 0.6 V, the duration time is 1 second, and the frequency is 10 minutes. In a case where the degree of the activation process is the second lowest level L3, the target electric potential is 0.4 V, the duration time is 5 seconds, and the frequency is 5 minutes. In a case where the degree of the activation process is the second highest level L2, the target electric potential is 0.2 V, the duration time is 10 seconds, and the frequency is 1 minute. In a case where the degree of the activation process is the highest level L1, the target electric potential is 0.05 V, the duration time is a period where a condition is satisfied, and the frequency is continuous. Data shown in Table 1 is stored on, for example, the ROM 62 of the electronic control unit 60.

As an index for determining the degree of the activation process, in addition to the amount of cationic impurities in the electrolyte membrane 5e, other factors such as a temperature of the fuel cell stack 10 or a history of an operation output may be used.

For example, the temperature of the fuel cell stack 10 corresponds to the relative humidity of the electrolyte membrane 5e, that is, the moisture content (water content) per unit volume, and has a correlation with the relative humidity of the electrolyte membrane 5e. In a case where the temperature of the fuel cell stack 10 is relatively high, the relative humidity (moisture content) of the electrolyte membrane 5e is low, which has a large effect on the cationic impurities in the electrolyte membrane 5e. This point is clear from data shown in FIG. 9. FIG. 9 is a graph showing an example of a relationship between the resistance of the electrolyte membrane and the amount of cationic impurities. In FIG. 9, the vertical axis the resistance of the electrolyte membrane 5e, that is, the transfer resistance of protons ($H^+$) in the electrolyte membrane 5e, and the horizontal axis represents the sulfonate group substitution proportion. A curve B1 represents a case where the relative humidity of the electrolyte membrane 5e is 30%, and a curve B2 represents a case where the relative humidity of the electrolyte membrane 5e is 80%. As shown in FIG. 9, as the relative humidity decreases (curve B1), the membrane resistance increases, that is, the battery performance tends to decrease (the proton transfer resistance has a correlation (negative correlation) with power generation performance). This tendency becomes significant as the sulfonate group substitution proportion (amount of cationic impurities) increases. Therefore, it was found that, on the condition that the relative humidity of the electrolyte membrane 5e is low, that is, the temperature of the fuel cell stack 10 is high, deterioration in the battery performance is significant even at the same amount of cationic impurities, and the effect of the activation process is high. Accordingly, on the condition that the amount of cationic impurities is the same, in a case where the relative humidity of the electrolyte membrane 5e is low, that is, the temperature of the fuel cell stack 10 is relatively high, the degree of the activation process is determined which is higher than that determined in a case where the relative humidity of the electrolyte membrane 5e is high, that is, the temperature of the fuel cell stack 10 is low. For example, a method of changing the degree of the activation process based on whether the temperature of the fuel cell stack 10 is a preset threshold temperature (for example, 80° C.) or higher or lower than the threshold temperature may be considered. In this case, data of the threshold temperature is stored on, for example, the ROM 62 of the electronic control unit 60.

Figure 10:
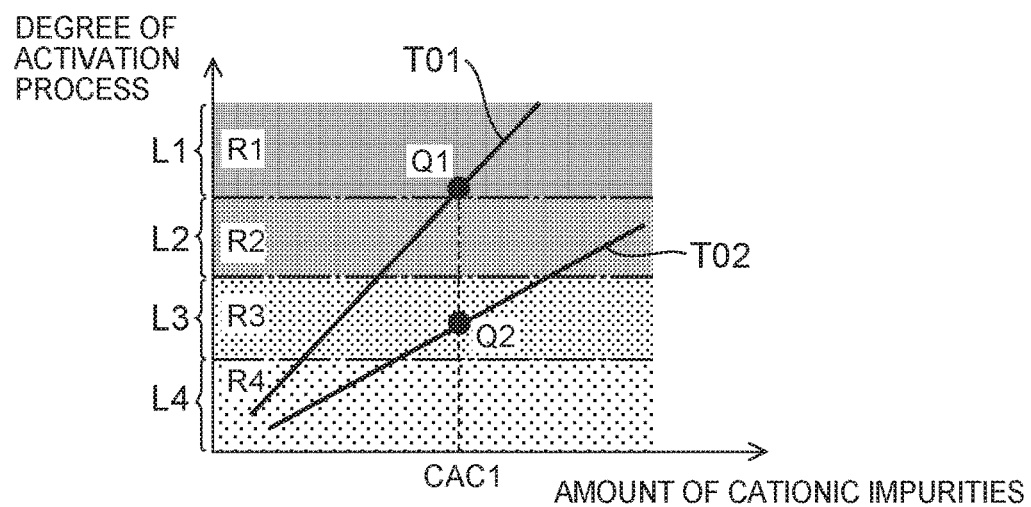
FIG. 10 is a graph for determining a degree of the activation process.

FIG. 10 is a graph for determining a degree of the activation process. This graph shows a relationship between the amount of cationic impurities in the electrolyte membrane 5e, the temperature of the fuel cell stack 10, and the four levels L1 to L4 of Table 1 which are the degrees of the activation process. Here, the horizontal axis represents the amount of cationic impurities, and the vertical axis represents the degree of the activation process. A straight line T01 is a graph representing a case where the temperature obtained by the temperature sensor 18 is 80° C. or higher, and a straight line T02 is a graph representing a case where the temperature obtained by the temperature sensor 18 is lower than 80° C. This graph is divided into a R1 region, a R2 region, a R3 region, and a R4 region in order from the highest degree of the activation process to the lowest. Data shown in FIG. 10 is stored on, for example, the ROM 62 of the electronic control unit 60.

The degree of the activation process is determined based on the estimated amount of cationic impurities and whether the degree of the activation process shown on the straight line T01 or T02 is in the R1 region, the R2 region, the R3 region, or the R4 region which is determined according to the measured temperature of the fuel cell stack 10. In a case where the degree of the activation process shown on the straight line is in the R1 region, the degree of the activation process is determined as L1. In a case where the degree of the activation process shown on the straight line is in the R2 region, the degree of the activation process is determined as L2. In a case where the degree of the activation process shown on the straight line is in the R3 region, the degree of the activation process is determined as L3. In a case where the degree of the activation process shown on the straight line is in the R4 region, the degree of the activation process is determined as L4. For example, in a case where the amount of cationic impurities is estimated as CAC1 and the temperature of the single fuel cell 2 is lower than 80° C., a point Q2 on the straight line T02 is specified. Since the point Q2 is in the R3 region, L3 is selected as the degree of the activation process. In addition, in a case where the amount of cationic impurities is estimated as CAC1 and the temperature of the single fuel cell 2 is 80° C. or higher, a point Q1 on the straight line T01 is specified. Since the point Q1 is in the R1 region, L1 is selected as the degree of the activation process.

Based on the above results, in the fuel cell system A, in order to improve the performance of the single fuel cell 2 during the operation of the fuel cell system A, a performance improvement control action of improving the performance of the single fuel cell 2 using the following activation process is performed.

Figure 11:
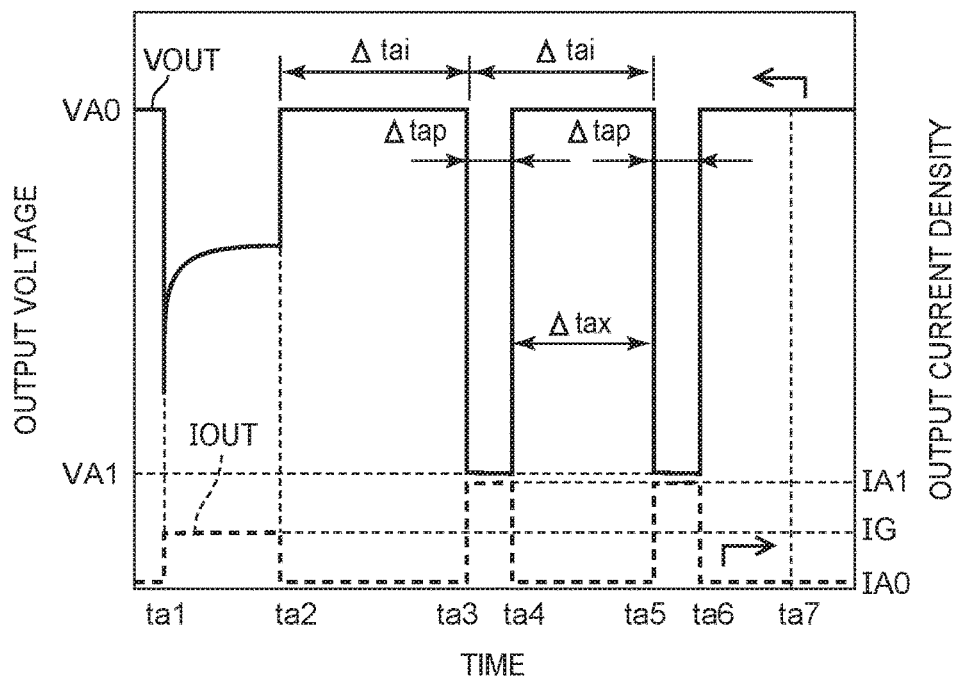
FIG. 11 is a diagram showing a performance improvement method of a single fuel cell.

FIG. 11 is a diagram showing a performance improvement method of a single fuel cell. The left vertical axis represents an output voltage VOUT of the single fuel cell 2, the right vertical axis represents an output current IOUT (shown as a current density) of the single fuel cell 2, and the horizontal axis represents the time. A solid curve shows the output voltage VOUT of the single fuel cell 2, and a dotted curve shows the output current IOUT of the single fuel cell 2. Since the anode electric potential is 0 V, the output voltage VOUT can be considered the cathode electric potential. Even when the fuel cell system A is under an unloaded condition, that is, in an idle operation, deterioration of the anode catalyst layer 5as and the cathode catalyst layer 5cs is prevented by applying a minimum constant output current, that is, an idle output current to the fuel cell stack 10 such that an open circuit voltage is applied between the anode 5a and the cathode 5c. At this time, the output voltage VOUT is the idle output voltage.

In an embodiment shown in FIG. 11, when the fuel cell system A idles at an idle output current IA0 and an idle output voltage VA0, the performance improvement control action of the single fuel cell 2 is suitably performed. The reason for this is as follows. Since the supply amount of oxidant gas is reduced in the activation process which is performed in the performance improvement method of a single fuel cell, the output of the fuel cell decreases, but the output required for the fuel cell during the idle operation is low. Therefore, there is little effect on the behavior of a vehicle such as acceleration performance. In the embodiment, when a transmission is in the parking (P) range and an ignition switch is switched on, an idle operation is performed. By determining whether or not a transmission is in the P range, whether or not an idle operation is performed is determined. In another embodiment not shown in the drawings, the electronic control unit 60 (CPU 64) determines whether or not the fuel cell stack 10 idles in the P range based on the output signal output from the output sensor 17. In the embodiment, the performance improvement method of a single fuel cell during an idle operation when a transmission is positioned in the P range is performed. The reason for this is as follows. When an idle operation is performed in a case where a transmission is in the drive (D) range, the fuel cell system may be immediately shifted from the idle operation to a normal operation in which the fuel cell system operates at an output current and an output voltage corresponding to a load. Therefore, in a case where the supply amount of oxidant gas is reduced in the activation process, there may be a problem in the normal operation. Alternatively, it is necessary to stop the activation process. On the other hand, in a case where a transmission is in the P range, it can be expected that the time of an idle operation is longer than that in a case where a transmission is in the D range. Therefore, the idle output current IA0 is a desired current value of the fuel cell stack 10 during an idle operation in the P range during which the performance improvement control action of the single fuel cell 2 is not performed.

Referring to FIG. 11, at a time ta1, first, the electronic control unit 60 (CPU 64) receives an output signal representing a range of a transmission from the range sensor 19 of the transmission. When the transmission is not in the P range, the performance improvement control action of the single fuel cell 2 is finished, and a normal operation is performed. During the normal operation, the fuel cell stack 10 operates at an output current and an output voltage corresponding to a load required for a vehicle.

In a case where the transmission is in the P range, when the degree of the activation process relating to an activation process control action of the single fuel cell 2, which is desired to be performed, is not set, the amount of cationic impurities in the electrolyte membrane 5e is estimated. That is, during a period from the time ta1 to a time ta2, the electronic control unit 60 (CPU 64) performs a cationic impurity amount estimation control action. The cationic impurity amount estimation control action will be described below. As a result, at the time ta2, the amount of cationic impurities in the electrolyte membrane 5e, that is, the sulfonate group substitution proportion in the embodiment is estimated. On the other hand, when the degree of the activation process is set, an activation process control action of performing the activation process is performed. The activation process control action will be described below.

Next, the electronic control unit 60 (CPU 64) performs an activation process degree determination control action. First, the temperature of the fuel cell stack 10 is measured. That is, at the time ta2, the electronic control unit 60 (CPU 64) acquires the temperature of the fuel cell stack 10 from the temperature sensor 18. The temperature sensor 18 can be considered a temperature measuring unit configured to measure the temperature of the fuel cell stack 10. As described above, the temperature of the fuel cell stack 10 has a correlation with the relative humidity of the electrolyte membrane 5e. For example, in a case where the temperature of the fuel cell stack 10 is relatively high, the relative humidity of the electrolyte membrane 5e is low. Therefore, the temperature sensor 18 can be considered a correlation parameter measuring unit configured to measure a value of a parameter correlating to the relative humidity of the electrolyte membrane 5e.

The electronic control unit 60 (CPU 64) determines the degree of the activation process as one of L1 to L4 by referring to the data regarding the graph of FIG. 10 and the data regarding the content of Table 1 which are stored on the ROM 62 based on the amount of cationic impurities of the electrolyte membrane 5e and the temperature of the fuel cell stack 10. In the example shown in the drawing, the degree of the activation process is determined based on a target electric potential VA1, a processing frequency Δtai, and a duration time Δtap. The electronic control unit 60 (CPU 64) can be considered as a process degree determining unit configured to determine the degree of the activation process based on the amount of cationic impurities and the like.

Next, the electronic control unit 60 (CPU 64) performs an activation process control action based on the determined degree of the activation process. That is, the activation process of holding the output voltage VOUT, that is the cathode electric potential at the target electric potential VA1 for the duration time Δtap at the processing frequency Δtai while reducing the flow rate of oxidant gas which is supplied to the cathode 5c by the turbo compressor 44 is performed That is, first, in a period from the time ta2 to a time ta3, based on a command from the electronic control unit 60, the DC/DC converter 11 holds the output voltage VOUT at the idle output voltage VA0 and holds the output current IOUT at the idle output current IA0. Next, in a period from the time ta3 to a time ta4, based on a command from the electronic control unit 60, the DC/DC converter 11 changes the output voltage VOUT to the target electric potential VA1 such that the activation process is performed. The electronic control unit 60 (CPU 64), the turbo compressor 44, and the DC/DC converter 11 can be considered a processing unit configured to perform the activation process of temporarily reducing the cathode electric potential of the single fuel cell to the target electric potential for the duration time at the processing frequency.

Next, the above-described operations are repeated. For example, in a period from the time ta4 to a time ta5, the output voltage VOUT is held at the idle output voltage VA0, and the output current IOUT is held at the idle output current IA0. Next, in a period from the time ta5 to a time ta6, the output voltage VOUT is changed to the target electric potential VA1, and the output current IOUT is changed to an end current IA1. As a result, the activation process is performed. In a case where the processing frequency is "continuous", a period Δtax during which the output voltage VOUT is held at the idle output voltage VA0 in FIG. 11 is 0 (zero).

Next, for example, at a time ta7, in a case where it is not desired to perform the activation process of the electrode catalyst of the cathode, for example, in a case where a transmission of a vehicle is shifted to the drive (D) range, the electronic control unit 60 (CPU 64) prevents the activation process.

In the embodiment, the cationic impurity amount estimation control action is performed during the idle operation. However, in another embodiment not shown in the drawings, the cationic impurity amount estimation control action is performed during an operation other than the idle operation.

In the activation process degree determination control action of the embodiment, the amount of cationic impurities in the electrolyte membrane 5e and the temperature of the fuel cell stack 10 is referred. However, in another embodiment not shown in the drawings, only the amount of cationic impurities in the electrolyte membrane 5e is referred, or the amount of cationic impurities in the electrolyte membrane 5e and at least one among the temperature of the fuel cell stack 10 and the operation output of the fuel cell stack 10 are referred.

In the activation process degree determination control action of the embodiment, the temperature of the fuel cell stack 10 is referred as the parameter correlating to the relative humidity. In another embodiment not shown in the drawings, another parameter from which the relative humidity of the electrolyte membrane 5e in the single fuel cell 2 can be estimated is used instead of the temperature of the fuel cell stack 10. Examples of the other parameter correlating to the relative humidity include an impedance of the single fuel cell 2, a humidity of gas near the electrolyte membrane 5e of the single fuel cell 2, and a temperature of a portion of the cooling water supply pipe 51 near the single fuel cell 2 in the fuel cell stack 10. For example, in a case where the impedance is high, it is estimated that the moisture content in the electrolyte membrane 5e is reduced and the conductivity deteriorates. Therefore, the relative humidity can be reduced. In a case where the humidity of gas near the electrolyte membrane 5e is low, it is estimated that moisture is evaporated from the electrolyte membrane 5e and reduced. Therefore, the relative humidity can be reduced. In a case where the temperature of a portion of the cooling water supply pipe 51 near the single fuel cell 2 is high, it is estimated that moisture is evaporated from the electrolyte membrane 5e and reduced. Therefore, the relative humidity can be reduced.

Next, a method of estimating the amount of cationic impurities in the electrolyte membrane 5e of the single fuel cell 2 of the fuel cell stack 10 will be described. As the method of estimating the amount of cationic impurities, the following method developed by the present inventor can be used. That is, in this method, the behavior of the output voltage of the single fuel cell 2 is measured when the output current of the single fuel cell 2 is increased stepwise and held during the operation of the fuel cell system A. This method is based on the fact, which is discovered by the present inventors, that the amount of cationic impurities in the electrolyte membrane 5e has a correlation with the behavior of the output voltage of the single fuel cell 2 measured when the output current of the single fuel cell 2 is increased stepwise and held during the operation of the fuel cell system A. Hereinafter, the details will be described with reference to the drawings.

Figure 12:
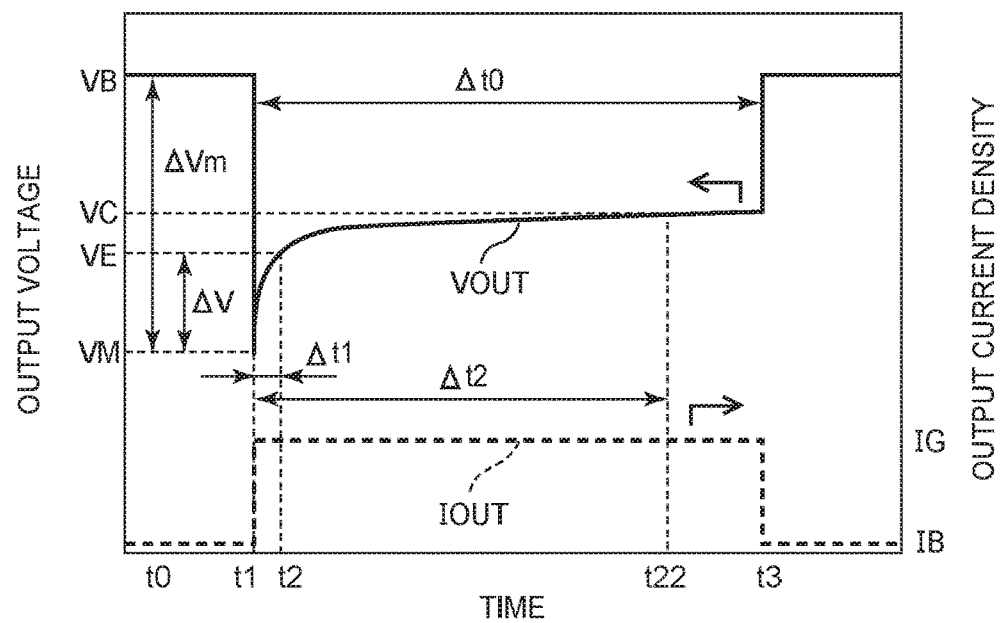
FIG. 12 is a diagram showing a method of estimating the amount of cationic impurities.

FIG. 12 is a diagram showing the method of estimating the amount of cationic impurities. This diagram schematically shows the behavior of the output voltage VOUT measured when the output current IOUT of the single fuel cell 2 is increased stepwise. In this drawing, the left vertical axis represents the output voltage VOUT of the single fuel cell 2, the right vertical axis represents the output current IOUT (shown as a current density) of the single fuel cell 2, and the horizontal axis represents the time. A solid curve shows the output voltage VOUT of the single fuel cell 2, and a dotted curve shows the output current IOUT of the single fuel cell 2.

FIG. 12 shows a case where the output current of the single fuel cell is controlled according to a predetermined pattern to estimate the amount of cationic impurities. That is, FIG. 12 shows a case where, when the fuel cell stack 10 operates at a base output current IB and a base output voltage VB at the time t0, the output current IOUT of the single fuel cell 2 is increased stepwise from the base output current IB to a predetermined increase current IG at the time t1 and is held at the increase current IG for an increase period of time $\Delta t0$ from the time t1 to the time t3. Here, the base output current IB is a desired current value of the fuel cell stack 10 during the normal operation during which the method of estimating the amount of cationic impurities is not performed. In FIG. 12, the base output current IB is an output current which is lower than a predetermined threshold current, for example, the output current IOUT of the fuel cell stack 10 under an unloaded condition. When the method of estimating the amount of cationic impurities (FIG. 12) is applied to the performance improvement control action (FIG. 11), the base output current IB corresponds to the idle output current IA0, and the base output voltage VB corresponds to the idle output voltage VA0.

In this case, the output voltage VOUT is reduced stepwise from the base output voltage VB to a minimal voltage VM at the time t1 and then is increased to a steady voltage VC, which is lower than the base output voltage VB, until the time t3 after the increase period of time $\Delta t0$. However, in the example shown in FIG. 12, the increase period of time $\Delta t0$ is a steady period of time which is sufficient for the output voltage VOUT to become the steady voltage. After the increase period of time $\Delta t0$ elapses, the output current IOUT returns to the base output current IB. At this time, at least the following three values relating to the behavior of the output voltage VOUT have a correlation with the amount of cationic impurities in the electrolyte membrane 5e. That is, the three values include: (1) an amount of voltage drop $\Delta V$ which is a difference between the minimal voltage VM and an output voltage VE, the out voltage VE being the output voltage VOUT at the time t2 after a preset period of time $\Delta t1$ elapses from the time t1; (2) an amount of minimum value drop $\Delta Vm$ which is a difference between the minimal voltage VM and the base output voltage VB; and (3) a period of time $\Delta t2$ from the time t1 to the time t22 required for the output voltage VOUT to become the steady voltage VC after the output current IOUT is increased to the increase current IG. As the amount of cationic impurities in the electrolyte membrane 5e increases, (1) the amount of voltage drop $\Delta V$ increases, (2) the amount of minimum value drop $\Delta Vm$ increases, and (3) the period of time required $\Delta t2$ increases. In the embodiment, (1) the amount of voltage drop is used.

Figure 13:
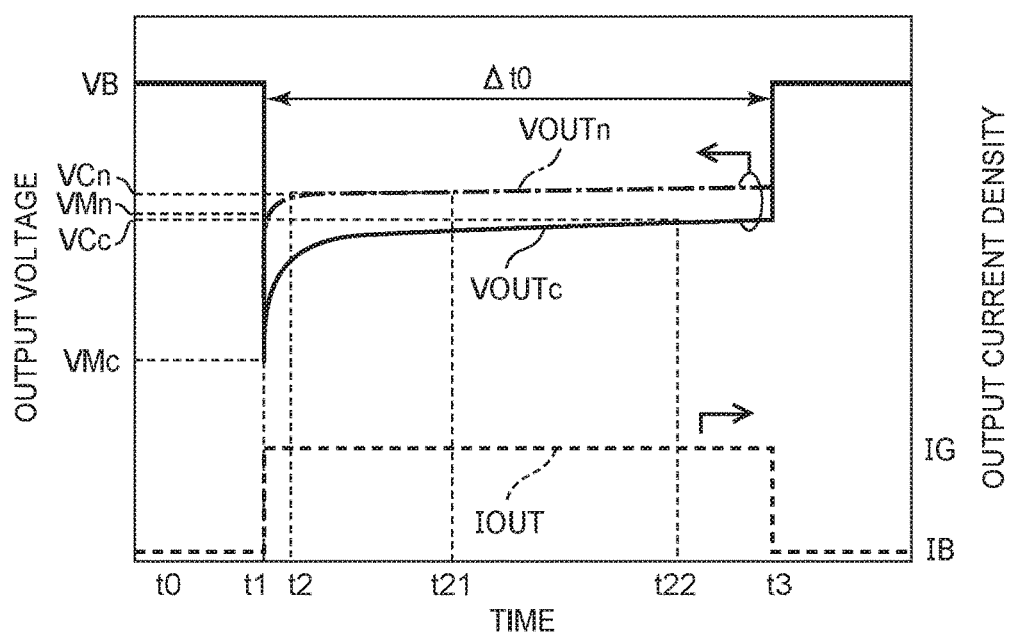
FIG. 13 is a diagram showing the method of estimating the amount of cationic impurities.
Figure 14:
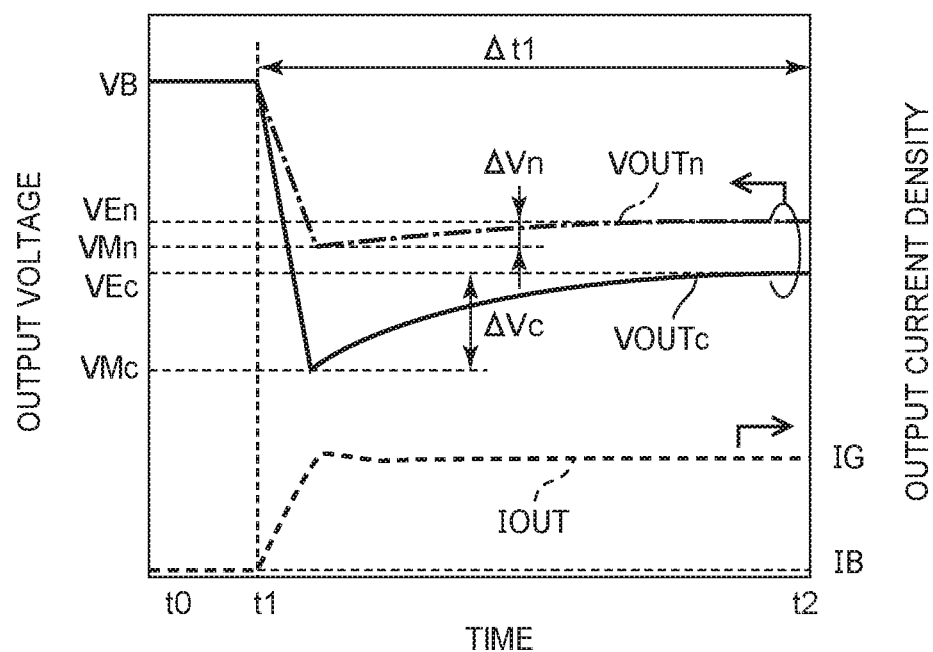
FIG. 14 is a diagram showing the method of estimating the amount of cationic impurities.

Regarding (1) the amount of voltage drop, FIG. 13 shows a difference between an output voltage VOUTn in a case where the amount of cationic impurities in the electrolyte membrane 5e is small and an output voltage VOUTc in a case where the amount of cationic impurities in the electrolyte membrane 5e is large, and FIG. 14 is an enlarged view showing a part of FIG. 13. The description regarding the left and right vertical axes and the horizontal axis is the same as in FIG. 12. When the fuel cell stack 10 operates at the base output current IB and the base output voltage VB at the time t0, the output current IOUT of the single fuel cell 2 indicated by the dotted line is increased stepwise from the base output current IB to the predetermined increase current IG at the time t1. The output current IOUT is held at the increase current IG for the increase period of time $\Delta t0$ from the time t1 to the time t3. Here, as indicated by the chain line in FIG. 13, the output voltage VOUTn in a case where the amount of cationic impurities in the electrolyte membrane 5e is small is reduced stepwise from the base output voltage VB to a minimal voltage VMn and then is increased to a steady voltage VCn, which is lower than the base output voltage VB, at a time t21 after the time t2. On the other hand, as indicated by the solid line in FIG. 13, the output voltage VOUTc in a case where the amount of cationic impurities in the electrolyte membrane 5e is large is reduced stepwise from the base output voltage VB to a minimal voltage VMc and then is increased to a steady voltage VCc, which is lower than the base output voltage VB, at a time t22 after the time t2.

At this time, as the amount of cationic impurities in the electrolyte membrane 5e increases, the amount of voltage drop $\Delta V$, which is a difference between the minimal voltage VM and the output voltage VE at the time t2 after the preset period of time $\Delta t1$ elapses from the time t1, increases. In this case, the preset period of time $\Delta t1$ is an arbitrary value which is shorter than the increase period of time $\Delta t0$. For example, as shown FIG. 14, an amount of voltage drop $\Delta Vc$, which is a difference between the minimal voltage VMc and an output voltage VEc in a case where the amount of cationic impurities in the electrolyte membrane 5e is large, is larger than an amount of voltage drop $\Delta Vn$ which is a difference between the minimal voltage VMn and an output voltage VEn in a case where the amount of cationic impurities in the electrolyte membrane 5e is small.

Figure 15:
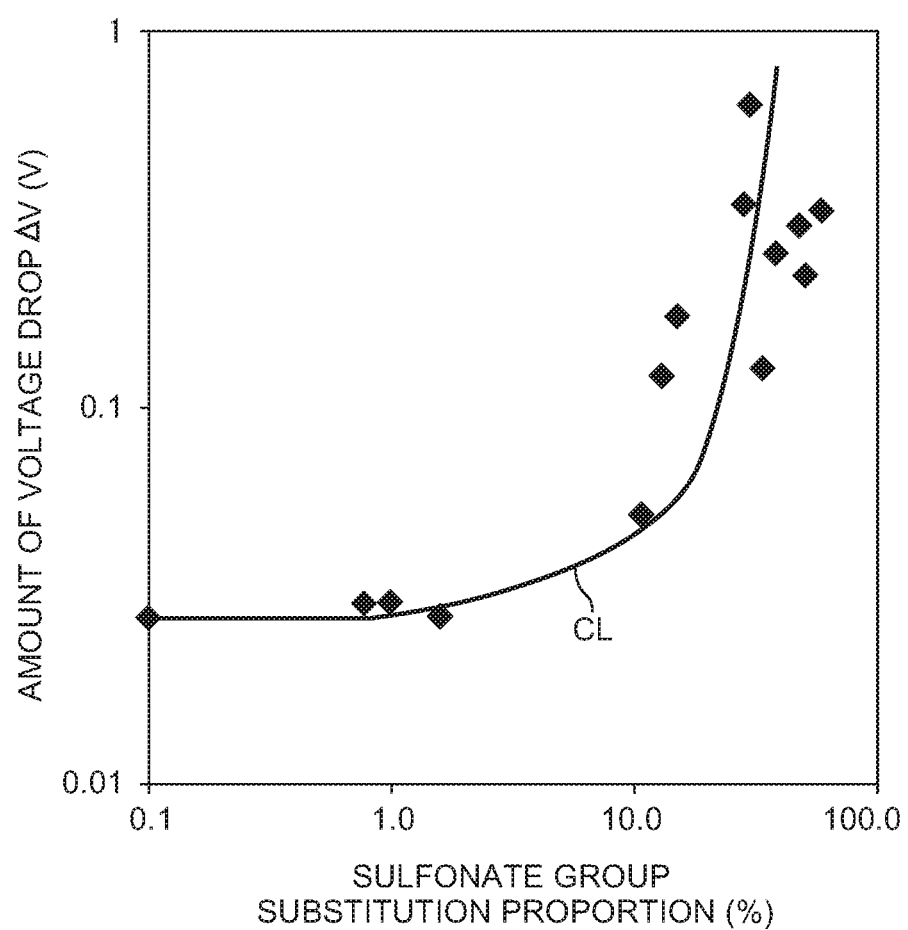
FIG. 15 is a graph showing an example of a relationship between the amount of voltage drop and the amount of cationic impurities.

FIG. 15 shows an example of a relationship between the amount of cationic impurities and the amount of voltage drop $\Delta V$. The horizontal axis represents a proportion of protons of the sulfonate group in the electrolyte membrane 5e substituted with cationic impurities. The vertical axis represents the amount of voltage drop $\Delta V$. This substitution proportion is an example of a value indicating the amount of cationic impurities. As shown in a curve CL, as the proportion of protons in the sulfonate group of the electrolyte membrane 5e substituted with cationic impurities increases, the amount of voltage drop $\Delta V$ increases, and the proportion of protons in the sulfonate group substituted with cationic impurities has a correlation with the amount of voltage drop $\Delta V$. Therefore, if data shown in FIG. 15 is measured in advance at the predetermined increase current IG in the increase period of time $\Delta t0$, the sulfonate group substitution proportion, that is, the amount of cationic impurities can be estimated by measuring the amount of voltage drop $\Delta V$ and referring to the data measured in advance. Here, the data regarding the graph of FIG. 15 for estimating the amount of cationic impurities is obtained in advance and is stored on the ROM 62.

The reason why the relationship between the amount of cationic impurities and the amount of voltage drop $\Delta V$ is as shown in FIG. 15 is not clear but is presumed to be as follows. First, the reason why, when the output current IOUT of the fuel cell stack 10 is increased stepwise from the predetermined base output current IB to the increase current IQ the output voltage VOUT is rapidly reduced to VM is presumed to be as follows. The anode 5a is dried due to an effect of accompanying water, cationic impurities move more slowly than the accompanying water, the impurities move so as to follow, and thus the internal resistance temporarily increases. Next, the reason why the output voltage VOUT slowly returns to VE is presumed to be as follows. Since the movement of cationic impurities is slow, a large amount of cationic impurities are present on the anode 5a side of the electrolyte membrane 5e immediately after the increase in the output current IOUT. However, cationic impurities Q slowly move the cathode 5c side, are stabilized, and do not inhibit conduction of H+ ions. As a result, the output voltage VOUT also slowly returns to VE. In this way, VM and VE have an effect on cationic impurities. Therefore, the relationship between the amount of cationic impurities and the amount of voltage drop $\Delta V$ (=ME−VM) is as shown in FIG. 15.

However, during the measurement of the amount of voltage drop $\Delta V$, in order to easily perform the measurement, it is preferable to set the increase current IG and the base output current IB such that the amount of voltage drop $\Delta V$ is large. To that end, the increase current IG and the base output current IB may be set such that the amount of voltage drop $\Delta V$ is extremely large when the base output current IB is increased stepwise to the increase current IG. For example, the increase current IG is set as the output current IOUT measured in a full load state of the fuel cell system A. In this case, the output current IOUT is extremely increased, and the output voltage VOUT is extremely reduced correspondingly. Therefore, the amount of voltage drop $\Delta V$ can also be increased. Alternatively, when the base output current IB is lower than a predetermined threshold current, the output current IOUT is increased stepwise from the base output current IB to the increase current IG. In this case, since the base output current IB is low, the base output voltage VB as a reference is increased. Therefore, the amount of voltage drop $\Delta V$ can be significantly increased.

Figure 16:
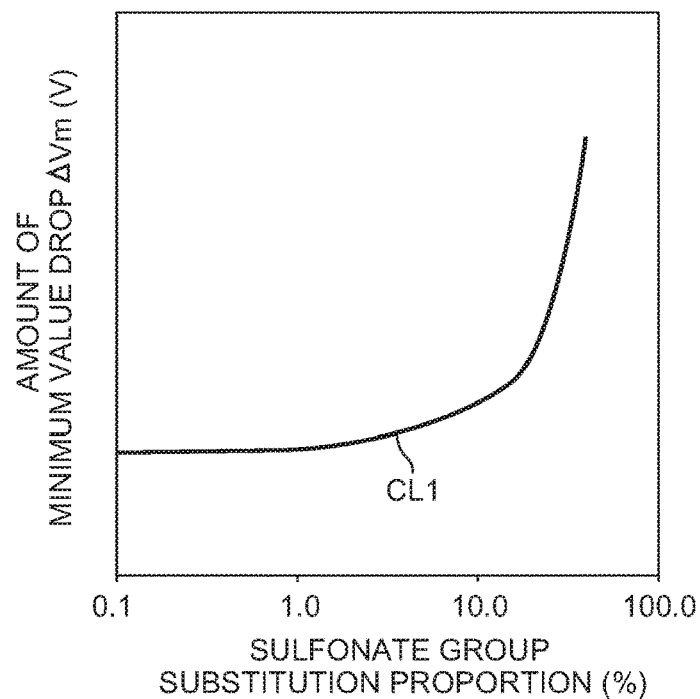
FIG. 16 is a graph showing an example of a relationship between the amount of minimum value drop and the amount of cationic impurities.
Figure 17:
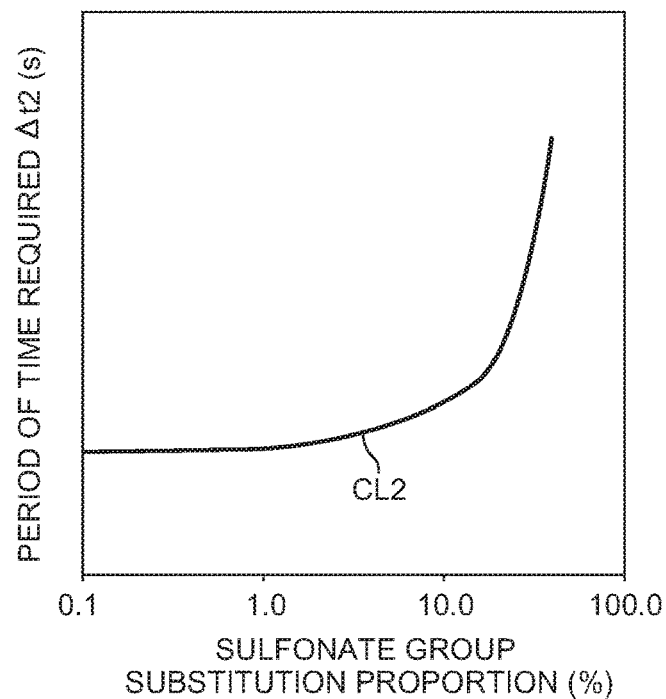
FIG. 17 is a graph showing an example of a relationship between a period of time required and the amount of cationic impurities.

In the embodiment, (1) the amount of voltage drop is used. However, in another embodiment, (2) the amount of minimum value drop or (3) the period of time required is used. Regarding (2) the amount of minimum value drop, FIG. 16 shows an example of a relationship between the amount of cationic impurities and the amount of minimum value drop $\Delta Vm$. The horizontal axis represents the sulfonate group substitution proportion in the electrolyte membrane 5e. The vertical axis represents the amount of minimum value drop $\Delta Vm$. Therefore, the amount of cationic impurities can be obtained by measuring the amount of minimum value drop $\Delta Vm$ and referring to FIG. 16. On the other hand, regarding (3) the period of time required, FIG. 17 shows a relationship between the amount of cationic impurities and the period of time required $\Delta t2$. The horizontal axis represents the sulfonate group substitution proportion in the electrolyte membrane 5e. The vertical axis represents the period of time required $\Delta t2$. Therefore, the amount of cationic impurities can be obtained by measuring the period of time required $\Delta t2$ and referring to FIG. 17.

Based on the above-described fact, in the fuel cell system A, the cationic impurity amount estimation control action is performed with the method using (1) the amount of voltage drop when the amount of cationic impurities in the electrolyte membrane 5e of the fuel cell system A is estimated (at the time ta1) in the performance improvement control action (FIG. 11). However, in the embodiment, the base output current IB is the same as the idle output current IA0, and the base output voltage VB is the same as the idle output voltage VA0.

That is, based on a command (instruction) from the electronic control unit 60, the DC/DC converter 11 increases the output current IOUT, which is output from the fuel cell stack 10 (single fuel cell 2), stepwise from the predetermined base output current IB to the increase current IG and holds the output current IOUT at the increase current IG in the predetermined increase period of time $\Delta t0$. Next, the output current IOUT returns to the base output current IB. Here, the DC/DC converter 11 can be considered a controller which controls the current of the single fuel cell 2.

At this time, the output sensor 17 the behavior of the output voltage VOUT of the single fuel cell 2 which is reduced stepwise from the base output voltage VB to the minimal voltage VM and then is increased to the steady voltage VC, which is lower than the base output voltage VB, after the increase period of time $\Delta t0$. Here, the output sensor 17 can be considered a measuring unit which measures the output voltage VOUT of the single fuel cell 2. The measured behavior of the output voltage VOUT is stored on, for example, the RAM 63.

Next, based on the data of the output voltage VOUT stored on the RAM 63, the electronic control unit 60 calculates the amount of voltage drop $\Delta V$ after the preset period of time $\Delta t1$ elapses from the increase of the output current IOUT to the increase current IG. Next, the sulfonate group substitution proportion is estimated as the amount of cationic impurities in the electrolyte membrane 5e by referring to the data regarding the graph of FIG. 15 which is stored on the ROM 62 in advance based on the amount of voltage drop $\Delta V$. Here, the electronic control unit 60 can be considered as an estimating unit which estimates the amount of cationic impurities based on the measured output voltage VOUT of the single fuel cell 2.

By performing the above-described cationic impurity amount estimation control action, the fuel cell system A can estimate the amount of cationic impurities in the electrolyte membrane 5e of the single fuel cell 2 during the operation of the fuel cell system A. In the embodiment, the cationic impurity amount estimation control action is performed during the idle operation. However, the cationic impurity amount estimation control action may be performed during an operation other than the idle operation. In this case, the cationic impurity amount estimation control action is performed separately from the performance improvement control action.

In addition, the fuel cell system A includes the DC/DC converter 11 as a controller, the output sensor 17 as a measuring unit, and the electronic control unit 60 as an estimating unit. Therefore, the fuel cell system A can be considered to include a cationic impurity amount estimating unit which includes a controller and a measuring unit and is configured to estimate the amount of cationic impurities in an electrolyte membrane of a single fuel cell.

Figure 18:
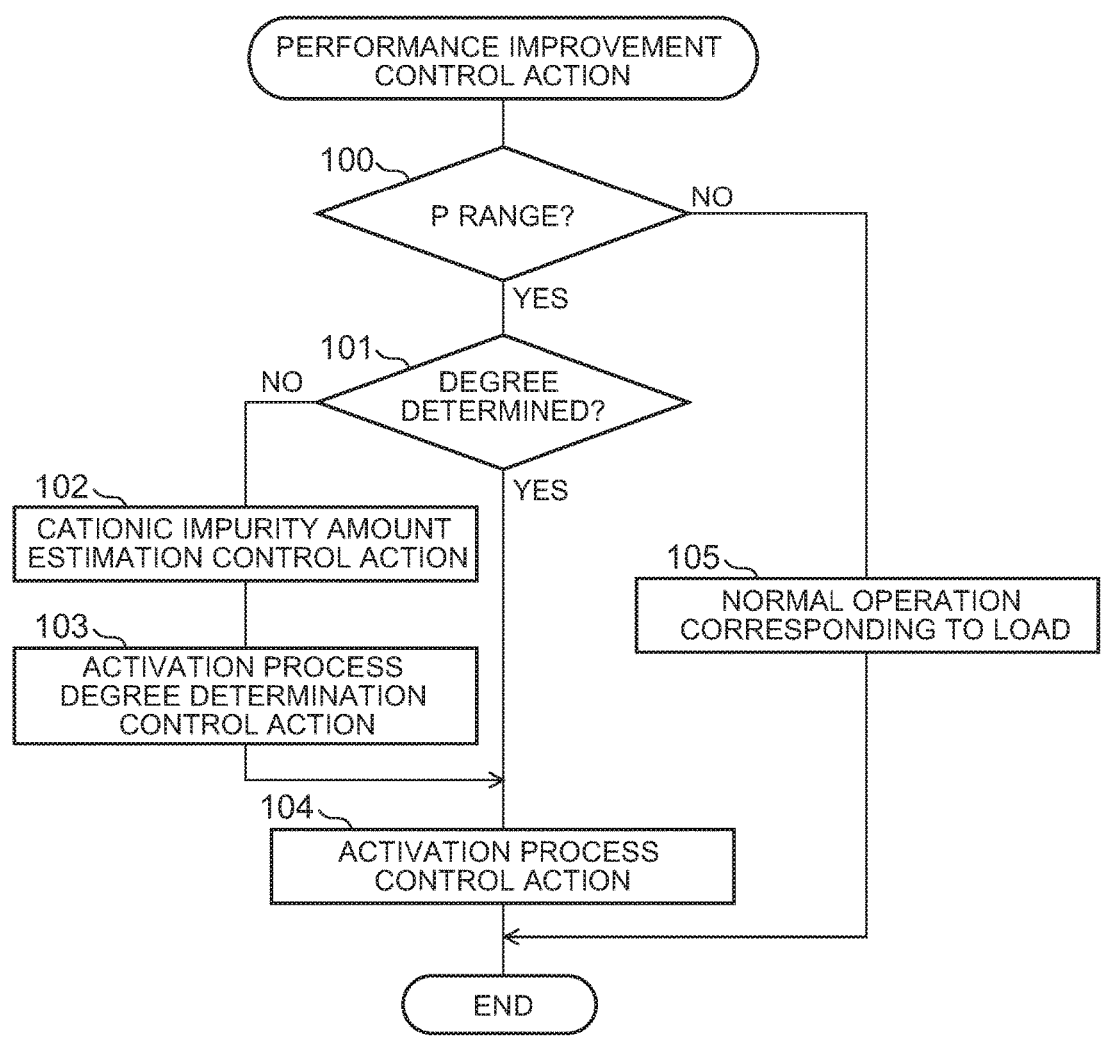
FIG. 18 is a flowchart showing a routine for a performance improvement control action of a fuel cell system.

FIG. 18 shows a routine for the performance improvement control action of the single fuel cell 2 in the fuel cell system A of FIG. 1. This routine is performed as an interruption action at an interval of a predetermined time. Referring to FIG. 18, in Step 100, whether or not a transmission is shifted to the P range is determined. In a case where the transmission is set in the P range, in Step 101, whether or not the degree of the activation process in the activation process control action is determined is determined. In a case where the degree of the activation process in the activation process control action is determined, the process proceeds to Step 104. Immediately after the transmission is shifted from the D range to the P range, the degree of the activation process is not determined. Therefore, the process proceeds to Step 102. In Step 102, the cationic impurity amount estimation control action of estimating the amount of cationic impurities in the electrolyte membrane 5e is performed. Next, in Step 103, the activation process degree determination control action of determining the degree of the activation process based on the amount of cationic impurities estimated in Step 102 is performed. Next, in Step 104, the activation process control action is performed based on the degree of the activation process determined in Step 103. In a case where the transmission is not set in the P range in Step 100, the normal operation is performed in the fuel cell system A in Step 105. During the normal operation, the fuel cell stack 10 operates at an output current and an output voltage corresponding to a load.

Figure 19:
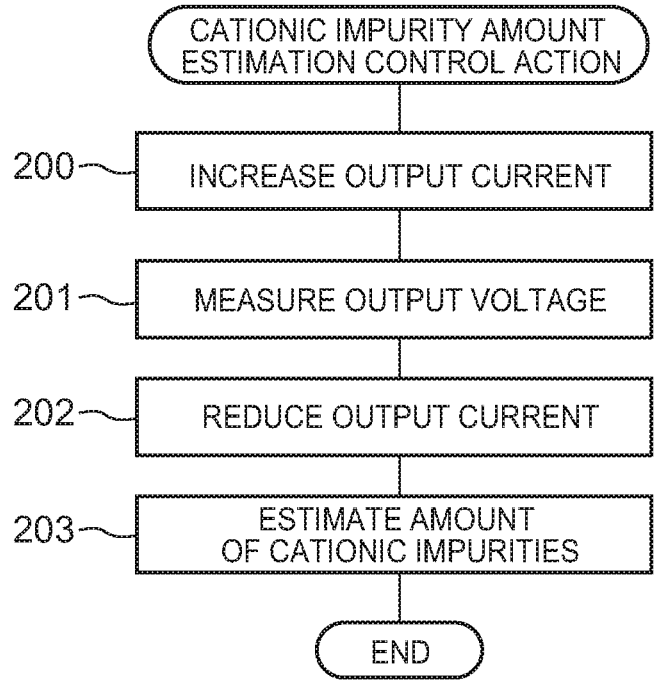
FIG. 19 is a flowchart showing a routine for a cationic impurity amount estimation control action in a fuel cell system.

FIG. 19 is a flowchart showing a routine for the cationic impurity amount estimation control action in the fuel cell system A shown in FIG. 1. This routine is performed in Step 102 of the performance improvement routine of FIG. 18. Here, in the embodiment, the base output current IB is the same as the idle output current IA0, and the base output voltage VB is the same as the idle output voltage VA0. Referring to FIG. 19, in Step 200, the output current IOUT of the fuel cell stack 10 is increased stepwise from the base output current IB to the increase current IG. The output current IOUT is held at the increase current IG for the increase period of time $\Delta t0$. Next, in Step 201, the behavior of the output voltage VOUT, which is reduced stepwise from the base output voltage VB to the minimal voltage VM and then is increased to the steady voltage VC lower than the base output voltage VB, is measured. Next, in Step 202, the output current IOUT is reduced to the base output current IB after the increase period of time $\Delta t0$ elapses from the stepwise increase of the output current IOUT to the increase current IG. Next, in Step 203, the amount of voltage drop $\Delta V$ after the preset period of time $\Delta t1$ elapses from the stepwise increase of the output current IOUT to the increase current IG is calculated based on the measured behavior of the output voltage VOUT. The amount of cationic impurities in the electrolyte membrane 5e is estimated by referring to the data regarding in the graph of FIG. 15 based on the amount of voltage drop $\Delta V$.

Figure 20:
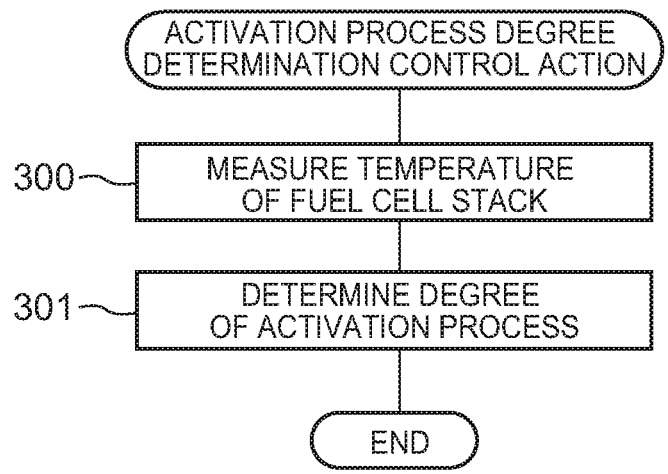
FIG. 20 is a flowchart showing a routine for an activation process degree determination control action of a fuel cell system.

FIG. 20 shows a routine for the activation process degree determination control action in the fuel cell system A of FIG. 1. This routine is performed in Step 103 of the performance improvement routine of FIG. 18. Referring to FIG. 20, the temperature of the fuel cell stack 10 is measured in Step 300. Next, in Step 301, the degree of the activation process (the target electric potential VA1, the processing frequency $\Delta tai$, and the duration time $\Delta tap$) is determined by referring to the data of FIG. 10 and the data of Table 1 based on the amount of cationic impurities in the electrolyte membrane 5e estimated in Step 102 and the temperature of the fuel cell stack 10 measured in Step 301.

Figure 21:
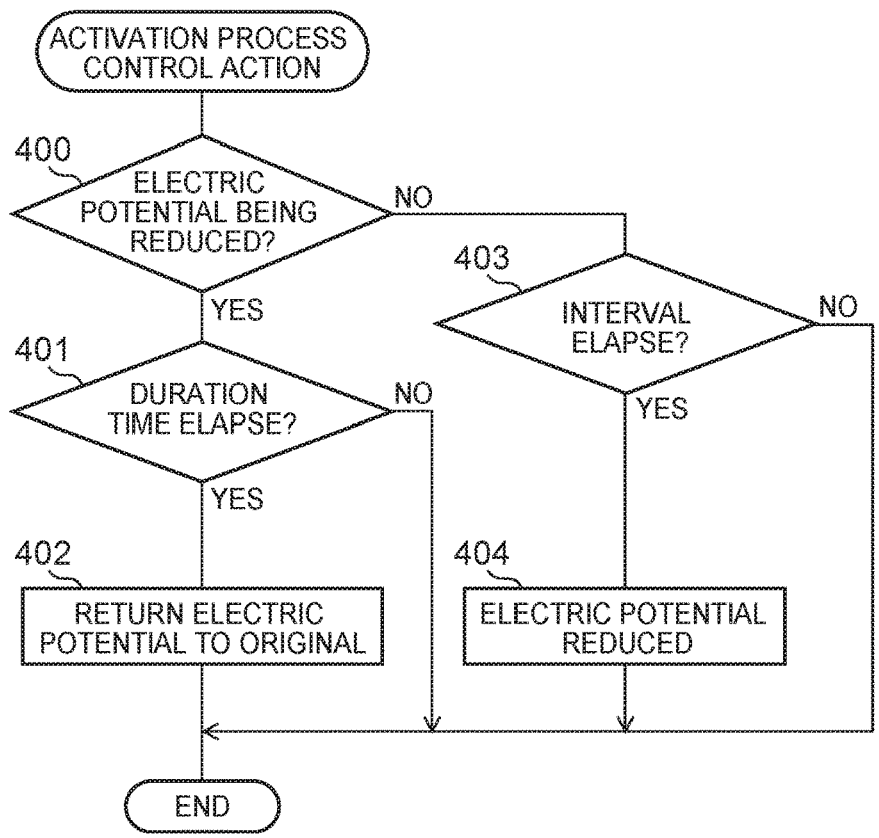
FIG. 21 is a flowchart showing a routine for an activation process control action of a fuel cell system.

FIG. 21 shows a routine for the activation process control action in the fuel cell system A of FIG. 1. This routine is repeatedly performed in Step 104 of the performance improvement routine of FIG. 18. Referring to FIG. 21, in Step 400, whether or not the output voltage VOUT is reduced to the target electric potential VA1 is determined. In a case where the output voltage VOUT is reduced to the target electric potential VA1, whether or not the duration time $\Delta tap$ elapses is determined in Step 401. In a case where the duration time $\Delta tap$ elapses, the output voltage VOUT returns to the original electric potential, that is, the idle output voltage VA0 in Step 402. On the other hand, in a case where the duration time $\Delta tap$ does not elapse, the process ends. In a case where the output voltage VOUT is not reduced to the target electric potential VA1 in Step 400, whether or not the processing frequency $\Delta tai$, that is, the interval elapses is determined in Step 403. In a case where the interval elapses, the output voltage VOUT is reduced to the target electric potential VA1 in Step 404. On the other hand, in a case where the interval does not elapse, the process ends.

Next, another embodiment of the fuel cell system A will be described. In the embodiment, in order to determine the degree of the activation process, a history of an operation output (output voltage×output current) of the fuel cell stack 10 is referred. The history of the operation output is stored on, for example, the RAM 63. The operation output of the fuel cell stack 10 is the operation output of the fuel cell stack 10 in a recent predetermined period of time (for example, 5 minutes) and corresponds to surrounding road conditions of a vehicle. In a case where the operation output in the recent predetermined period of time is relatively low, it can be estimated that the vehicle travels on a road where the operation output may be low, for example, a road in a traffic jam. Therefore, it can be estimated that the performance recovery effect obtained by performing the activation process will be small. Therefore, the activation process is not performed, or a low degree of the activation process is determined. Conversely, in a case where the operation output in the recent predetermined period of time is relatively high, it can be estimated that the vehicle travels on a road where the operation output is necessarily high, for example, a highway. Therefore, it can be estimated that the performance recovery effect obtained by performing the activation process will be large. Therefore, a high degree of the activation process is determined. At this time, the history of the operation output can be acquired from the RAM 63 on which the operating history is stored. The RAM 63 can be considered a recent history storing unit which stores a history of an operation output of the fuel cell stack 10 in a recent predetermined period of time.

Next, another embodiment of the fuel cell system A will be described. This embodiment is different from the above-described embodiment in the method of estimating the amount of cationic impurities in the electrolyte membrane 5e of the single fuel cell 2. Hereinafter, the method of estimating the amount of cationic impurities will be described.

Figure 22:
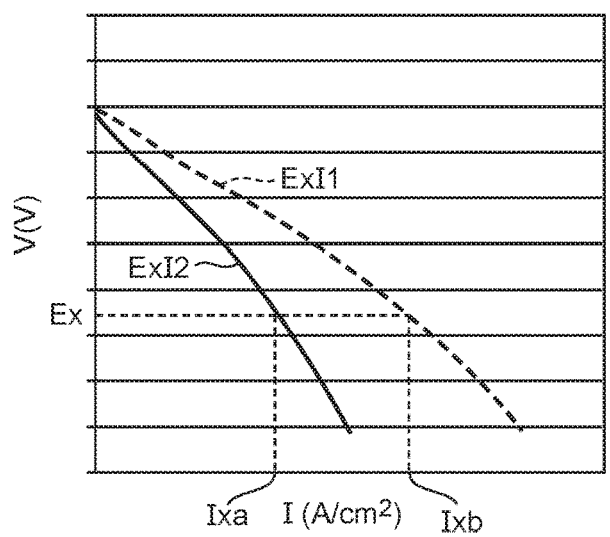
FIG. 22 is a diagram showing a method of estimating the amount of cationic impurities in another embodiment.
Figure 23:
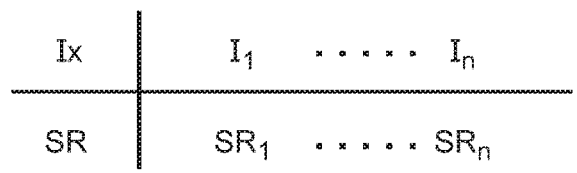
FIG. 23 is a table showing a relationship between an output current and the amount of cationic impurities.

FIG. 22 is a diagram showing the method of estimating the amount of cationic impurities, and shows the IV characteristics of the single fuel cell 2. The horizontal axis represents the output current density, and the vertical axis represents the output voltage. A curve ExI1 and a curve ExI2 represent cases where the cathode electric potential of the single fuel cell 2 is continuously held at a predetermined voltage (for example, 0.6 V) for a predetermined time (for example, 1 minute) immediately before measuring the IV characteristics. Here, the curve ExI1 represents a case where the electrolyte membrane 5e does not include cationic impurities, that is, the sulfonate group substitution proportion is 0%. The curve ExI2 represents a case where the electrolyte membrane 5e includes cationic impurities, that is, the sulfonate group substitution proportion is a predetermined value (for example, 30%) more than 0%. In the example shown in FIG. 22, in a case where the sulfonate group substitution proportion is 0% at a predetermined output voltage Ex (the curve ExI1), the output current density is Ixb. However, in a case where the sulfonate group substitution proportion is the predetermined value at the predetermined output voltage Ex, the output current density is Ixa. Therefore, by obtaining a relationship between the output current density and the sulfonate group substitution proportion at the predetermined output voltage Ex in advance in an experiment or the like, the sulfonate group substitution proportion can be obtained from the output current density. Specifically, after the cathode electric potential of the single fuel cell 2 is continuously held at a predetermined voltage for a predetermined time, and the output current density at the predetermined output voltage Ex is obtained. Then, by referring to the relationship between the sulfonate group substitution proportion and the output current density at the predetermined output voltage Ex which is obtained in advance, the sulfonate group substitution proportion can be obtained. A table such as FIG. 23 showing the relationship between the output current density Ix at the predetermined output voltage Ex and the sulfonate group substitution proportion SR is stored on the ROM 62.

Figure 24:
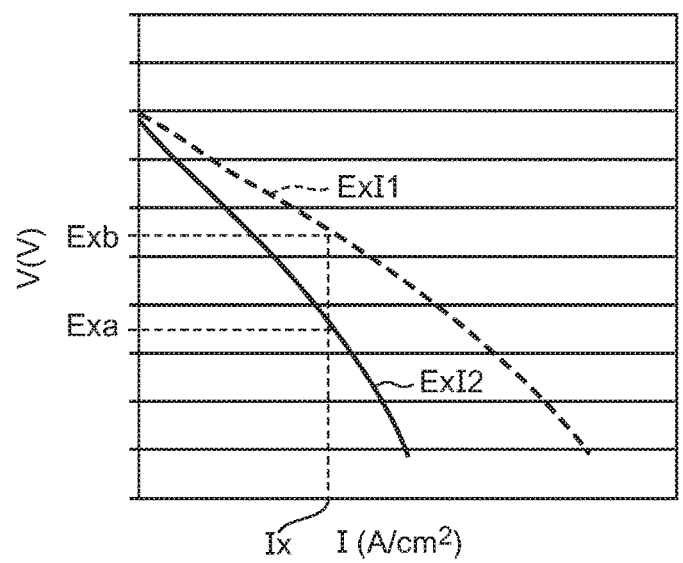
FIG. 24 is a diagram showing a method of estimating the amount of cationic impurities in another embodiment.
Figure 25:
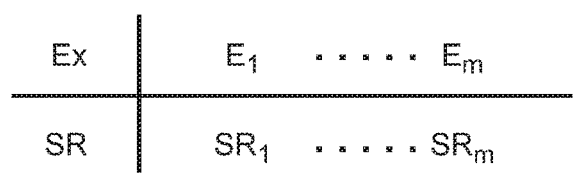
FIG. 25 is a table showing a relationship between an output voltage and the amount of cationic impurities.

Alternatively, the output voltage and the output current density may be replaced with each other. FIG. 24 is a diagram showing the method of estimating the amount of cationic impurities, and shows the IV characteristics of the single fuel cell 2. The description regarding the horizontal axis, the vertical axis, and the curves EXI1 and EXI2 is the same as in FIG. 22. In the example shown in FIG. 24, in a case where the sulfonate group substitution proportion is 0% at the predetermined output current density Ix (the curve ExI1), the output voltage is Exb. However, in a case where the sulfonate group substitution proportion is the predetermined value (for example, 30%) at the predetermined output current density Ix, the output voltage is Exa. Therefore, by obtaining a relationship between the output voltage and the sulfonate group substitution proportion at the predetermined output current density Ix in advance in an experiment or the like, the sulfonate group substitution proportion can be obtained from the output voltage. Specifically, after the cathode electric potential of the single fuel cell 2 is continuously held at a predetermined voltage (for example, 0.6 V) for a predetermined time (for example, 1 minute), and the output voltage at the predetermined output current density Ix is obtained. Then, by referring to the relationship between the sulfonate group substitution proportion and the output voltage at the predetermined output current density Ix which is obtained in advance, the sulfonate group substitution proportion can be obtained. A table such as FIG. 25 showing the relationship between the output voltage Ex at the predetermined output current density Ix and the sulfonate group substitution proportion SR is stored on the ROM 62.

Figure 26:
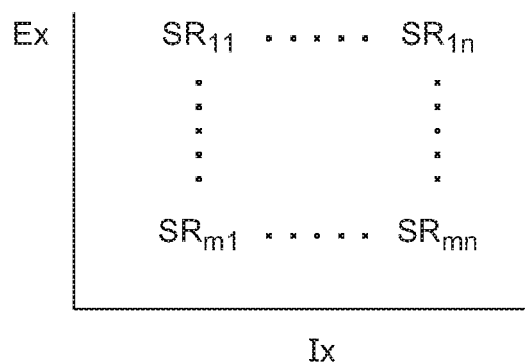
FIG. 26 is a table showing a relationship between an output voltage, an output current, and the amount of cationic impurities.

Alternatively, the output voltage and the output current density may be combined. That is, a table such as FIG. 26 showing a relationship between the output current density Ix, the output voltage Ex, and the sulfonate group substitution proportion SR is obtained in advance in an experiment. As a result, the sulfonate group substitution proportion SR can be obtained by referring to the table after measuring the output voltage Ex at an arbitrary value of the output current density Ix or measuring the output current density Ix at an arbitrary value of the output voltage Ex. The table such as FIG. 26 is stored on the ROM 62 in advance.

Figure 27:
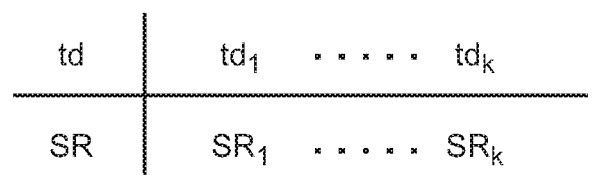
FIG. 27 is a table showing a relationship between an operating time and the amount of cationic impurities.

Next, still another embodiment of the fuel cell system A will be described. This embodiment is different from the above-described embodiment in the method of estimating the amount of cationic impurities in the electrolyte membrane 5e of the single fuel cell 2. As the cationic impurities, as described above, for example, Ca or Na included in a snow melting agent and Fe, Mo, Cr, or Al included in a component of the fuel cell system A are considered. Therefore, it is presumed that the amount of cationic impurities increases as long as the operating time of the fuel cell stack 10 increases. Therefore, a relationship between the operating time of the fuel cell stack 10 and the amount of cationic impurities in the electrolyte membrane 5e (sulfonate group substitution proportion) is obtained in advance in an experiment. As a result, the amount of cationic impurities (sulfonate group substitution proportion) can be obtained by acquiring the total operating time of the fuel cell stack 10 until that time. A table such as FIG. 27 showing the relationship between the total operating time td of the fuel cell stack 10 and the amount of cationic impurities in the electrolyte membrane 5e (sulfonate group substitution proportion) SR is stored on the ROM 62 in advance. At this time, the total operating time of the fuel cell stack 10 until that time can be acquired from the RAM 63 on which the operating history is stored. The parameter for estimating the amount of cationic impurities is not limited to the total operating time of the fuel cell stack 10. For example, a total traveling distance of a vehicle on which the fuel cell stack 10 is stored may be used, or a parameter indicating an operation record such as a function value obtained by combining a current value and/or a voltage value and the operating time of the fuel cell stack 10, for example, a total power generation amount of the fuel cell stack 10 (that is, a value obtained by multiplying the power by the time) or a total current value of the fuel cell stack 10 (that is, a value obtained by multiplying the current by the time) may be used. In a case where cationic impurities accumulating in the fuel cell stack 10 are removed by being washed using a well-known method, an operation record such as an operating time after the washing and removal may be used instead of the total operating time of the fuel cell stack 10. Values of these parameters are stored on the RAM 63. In this way, the RAM 63 can be considered as an operation record storing unit which stores a parameter indicating the operation record of the fuel cell stack 10.

Next, still another embodiment of the fuel cell system A will be described. In the above-described embodiments, first, (A) the cationic impurity amount estimating unit measures the electrical characteristics and the operating time of the single fuel cell 2 (hereinafter, referred to as "the electrical characteristics and the like"). Next, (B) the cationic impurity amount estimating unit estimates the amount of cationic impurities by referring to the relationship between the cationic impurity amount estimating unit and the electrical characteristics and the like, which is obtained in advance, based on the measured electrical characteristics and the like. (C) The activation process determining unit determines the degree of the activation process by referring to the relationship between the amount of cationic impurities and the degree of the activation process, which is set in advance, based on the estimated amount of cationic impurities. However, the disclosure is not limited to the embodiments.

In still another embodiment, the step (B) is not performed among the steps (A) to (C). First, (A) the cationic impurity amount estimating unit measures the electrical characteristics and the like of the single fuel cell 2. (C') The activation process determining unit determines the degree of the activation process by referring to a relationship between the electrical characteristics and the like and the degree of the activation process, which is set in advance, based on the measured electrical characteristics and the like.

For example, first, (A) when the fuel cell system A operates at the base output current IB and the base output voltage VB, the output current IOUT of the single fuel cell 2 is increased stepwise from the base output current IB to the predetermined increase current IG and is held at the increase current IG for the increase period of time Δt0. The output voltage VOUT of the single fuel cell 2 in the increase period of time Δt0 is measured. At this time, the difference (the amount of voltage drop) ΔV between the minimal voltage VM and the output voltage VE after the preset period of time Δt1 elapses from the increase of the output current IOUT to the increase current IQ the difference (the amount of minimum value drop) ΔVm between the minimal voltage VM and the base output voltage VB, or the period of time Δt2 required for the output voltage VOUT to become the steady voltage VC after the output current IOUT is increased to the increase current IG is acquired as the electrical characteristics and the like.

Next, (C') the degree of the activation process is determined by referring to a relationship between the degree of the activation process and the amount of voltage drop ΔV, the amount of minimum value drop ΔVm, or the period of time required Δt2, which is set in advance, based on the measured amount of voltage drop ΔV, the measured amount of minimum value drop ΔVm, or the period of time required Δt2. For example, it is determined that, as the amount of voltage drop ΔV increases, as the amount of minimum value drop ΔVm increases, or as the period of time required Δt2 increases, a high degree of the activation process is determined by performing one action or a combination of at least two actions among actions of changing conditions of the activation process, the actions including an action of reducing the target electric potential, an action of increasing the duration time, and an action of increasing the processing frequency.

Here, the relationship between the degree of the activation process and the amount of voltage drop ΔV, the amount of minimum value drop ΔVm, or the period of time required Δt2, which is set in advance, can be easily obtained, for example, by combining the graph of FIG. 15, the graph of FIG. 16, or the graph of FIG. 17 with the graph of FIG. 10.

Alternatively, for example, first, (A) after the output voltage VOUT of the single fuel cell 2 is held at a predetermined voltage value for a predetermined period of time, the output current Ix at the predetermined output voltage Ex or the output voltage Ex at the predetermined output current Ix is acquired. Next, (C') the degree of the activation process is determined by referring to the relationship between the degree of the activation process and the output current Ix or the output voltage ex, which is set in advance, based on the measured output current Ix or the measured output voltage Ex. For example, when the output current Ix or the output voltage Ex is relatively low, the degree of the activation process is determined to be higher than that determined when the output current Ix or the output voltage Ex is relatively high by performing one action or a combination of at least two actions among actions of changing conditions of the activation process, the actions including an action of reducing the target electric potential, an action of increasing the duration time, and an action of increasing the processing frequency.

Here, the relationship between the degree of the activation process and the output current Ix or the output voltage Ex, which is set in advance, can be easily obtained by combining the table of FIG. 22 and the table of FIG. 23 with the graph of FIG. 10 or combining the graph of FIG. 24 and the graph of FIG. 25 with the graph of FIG. 10.

In these cases, the same effect as in the embodiments described in FIGS. 1 to 21 can be exhibited.

Figure 28:
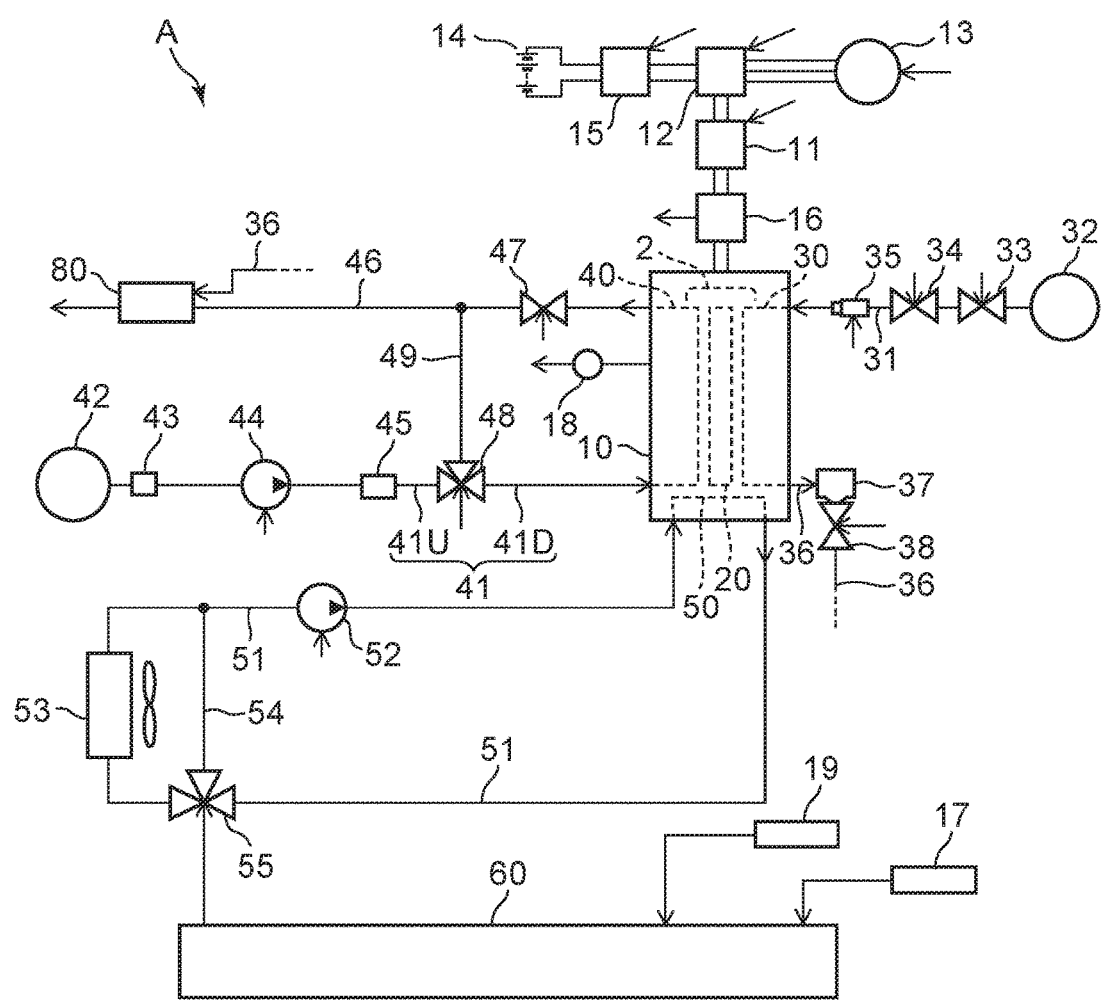
FIG. 28 is a block diagram showing a fuel cell system according to still another embodiment.

Next, still another embodiment of the fuel cell system A will be described with reference to FIG. 28. This embodiment is different from the embodiment shown in FIG. 1, except that the fuel cell system A is a hydrogen gas non-circulation type fuel cell system. Hereinafter, this difference will be mainly described.

The fuel cell system A shown in FIG. 1 is a fuel gas circulation type fuel cell system, that is, a system in which the outlet of the fuel gas flow path 30 is connected to the fuel gas supply pipe 31 through the anode off gas pipe 36 and the fuel gas circulation pipe 81 such that the anode off gas including fuel gas is circulated to the fuel gas supply pipe 31. On the other hand, in the fuel cell system A shown in FIG. 28, the fuel gas circulation pipe 81 and the fuel gas circulation pump 39 are not provided. That is, the fuel cell system A shown in FIG. 28 is a fuel gas non-circulation type fuel cell system, that is, a system in which the outlet of the fuel gas flow path 30 is separated from the fuel gas supply pipe 31 such that the anode off gas including fuel gas is not circulated to the fuel gas supply pipe 31.

Even in this case, the same effect as in the fuel cell system A shown in FIG. 1 can be exhibited.

What is claimed is:

1. A fuel cell system comprising:
   a processing unit configured to perform, during an idle operation of the fuel cell system, an activation process of temporarily reducing a cathode electric potential of at least one single fuel cell of the fuel cell system to a target electric potential for a duration time at a processing frequency;
   a cationic impurity amount estimating unit configured to estimate an amount of cationic impurities included in an electrolyte membrane of the single fuel cell; and
   a process degree determining unit configured to determine, when the amount of cationic impurities is large, a degree of the activation process which is higher than that determined when the amount of cationic impurities is small by performing one action or a combination of at least two actions among actions of changing conditions of the activation process, the actions including an action of reducing the target electric potential, an action of increasing the duration time, and an action of increasing the processing frequency,
   wherein the processing unit performs the activation process to the degree determined by the process degree determining unit.

2. The fuel cell system according to claim 1, wherein
   when the fuel cell system operates at a base output current and a base output voltage, the cationic impurity amount estimating unit is configured to estimate the amount of cationic impurities based on an output voltage of the single fuel cell which is obtained by increasing an output current of the single fuel cell stepwise from the base output current to a predetermined increase current, holding the output current at the increase current for an increase period of time, and measuring the output voltage in the increase period of time.

3. The fuel cell system according to claim 2, wherein
   when the output current is increased stepwise to the increase current and held at the increase current, the output voltage is reduced stepwise from the base output voltage to a minimal voltage and then is increased to a steady voltage which is lower than the base output voltage, and
   the cationic impurity amount estimating unit is configured to estimate the amount of cationic impurities to be larger as a difference between the minimal voltage and the output voltage, which is measured after a preset period of time shorter than the increase period of time elapses from the increase of the output current to the increase current, increases, to estimate the amount of cationic impurities to be larger as a difference between the minimal voltage and the base output voltage increases, or to estimate the amount of cationic impurities to be larger as a period of time, which is required for the output voltage to become the steady voltage after the output current is increased to the increase current, increases.

4. The fuel cell system according to claim 2, wherein the increase current is the output current measured with a full load of the fuel cell system.

5. The fuel cell system according to claim 2, wherein
   the cationic impurity amount estimating unit is configured to estimate, when the base output current of the single fuel cell is lower than a threshold current, the amount of cationic impurities based on the output voltage measured after increasing the output current of the single fuel cell stepwise to the increase current.

6. The fuel cell system according to claim 1, wherein
   the cationic impurity amount estimating unit is configured to estimate the amount of cationic impurities based on at least one of an output current at a predetermined output voltage or an output voltage at a predetermined output current which is measured after the output voltage of the single fuel cell is held at a predetermined voltage value for a predetermined time.

7. The fuel cell system according to claim 1, further comprising:
   an operation record storing unit configured to store an operation record of a fuel cell stack, wherein
   the cationic impurity amount estimating unit estimates the amount of cationic impurities based on the operation record of the fuel cell stack by referring to the operation record storing unit.

8. The fuel cell system according to claim 1, further comprising:
   a correlation parameter measuring unit configured to measure a value of a parameter correlating to a relative humidity of the electrolyte membrane in a fuel cell stack, wherein
   when the relative humidity is low, the process degree determining unit determines the degree of the activation process which is higher than that determined when the relative humidity is high based on the measured value of the parameter.

9. The fuel cell system according to claim 8, wherein
   the parameter is a temperature of cooling water in or near the fuel cell stack, an impedance, or a humidity of gas near the electrolyte membrane.

10. The fuel cell system according to claim 1, further comprising:
    a recent history storing unit configured to store a history of an output of a fuel cell stack in a recent predetermined period of time, wherein
    when the output in the recent predetermined period of time is high, the process degree determining unit is configured to determine the degree of the activation process which is higher than that determined when the output in the recent predetermined period of time is low.

11. A fuel cell system comprising:
    a processing unit configured to perform, during an idle operation of the fuel cell system, an activation process of temporarily reducing a cathode electric potential of at least one single fuel cell of the fuel cell system to a target electric potential for a duration time at a processing frequency; and
    a process degree determining unit configured to determine a degree of the activation process by performing one action or a combination of at least two actions among actions of changing conditions of the activation process, the actions including an action of reducing the target electric potential, an action of increasing the duration time, and an action of increasing the processing frequency,
    wherein the process degree determining unit obtains an output voltage of the single fuel cell by increasing an output current of the single fuel cell stepwise from a base output current to a predetermined increase current when the fuel cell system operates at the base output current and a base output voltage, holding the output current at the increase current for an increase period of time, and measuring the output voltage in the increase period of time, when the output current is increased stepwise to the increase current and held at the increase current, the output voltage is reduced stepwise from the base output voltage to a minimal voltage and then is increased to a steady voltage which is lower than the base output voltage, the process degree determining unit determines the degree of the activation process which becomes higher as a difference between the minimal voltage and the output voltage, which is measured after a preset period of time shorter than the increase period of time elapses from the increase of the output current to the increase current, increases, as a difference between the minimal voltage and the base output voltage increases, or as a period of time, which is required for the output voltage to become the steady voltage after the output current is increased to the increase current, increases, and the processing unit performs the activation process to the degree determined by the process degree determining unit.

12. A performance improvement method of a fuel cell system comprising:
performing an activation process of temporarily reducing a cathode electric potential of at least one single fuel cell to a target electric potential for a duration time at a processing frequency;
estimating the amount of cationic impurities included in an electrolyte membrane of the single fuel cell;
determining, when an amount of cationic impurities is large, a degree of the activation process which is higher than that determined when the amount of cationic impurities is small by performing one action or a combination of at least two actions among actions of changing conditions of the activation process, the actions including an action of reducing the target electric potential, an action of increasing the duration time, and an action of increasing the processing frequency; and performing the activation process to the determined degree when an idle operation of the fuel cell system is performed.

13. A performance improvement method of a fuel cell system comprising:
performing, during an idle operation of the fuel cell system, an activation process of temporarily reducing a cathode electric potential of at least one single fuel cell of the fuel cell system to a target electric potential for a duration time at a processing frequency;
determining a degree of the activation process by performing one action or a combination of at least two actions among actions of changing conditions of the activation process, the actions including an action of reducing the target electric potential, an action of increasing the duration time, and an action of increasing the processing frequency;
obtaining an output voltage of the single fuel cell by increasing an output current of the single fuel cell stepwise from a base output current to a predetermined increase current when the fuel cell system operates at the base output current and a base output voltage, holding the output current at the increase current for an increase period of time, and measuring the output voltage in the increase period of time;
determining, when the output current is increased stepwise to the increase current and held at the increase current, the output voltage is reduced stepwise from the base output voltage to a minimal voltage and then is increased to a steady voltage which is lower than the base output voltage, the degree of the activation process which becomes higher as a difference between the minimal voltage and the output voltage, which is measured after a preset period of time shorter than the increase period of time elapses from the increase of the output current to the increase current, increases, as a difference between the minimal voltage and the base output voltage increases, or as a period of time, which is required for the output voltage to become the steady voltage after the output current is increased to the increase current, increases; and
performing the activation process to the determined degree.

* * * * *